(12) United States Patent
Sheng et al.

(10) Patent No.: US 6,924,913 B2
(45) Date of Patent: Aug. 2, 2005

(54) MULTIPLE-RESOLUTION SCANNING DEVICE

(75) Inventors: Thomas Sheng, Hsin Chu (TW); Chi Yao Chen, Hsin Chu (TW); Hyman Shiao, Miao Li (TW); Yueh Shing Lee, Yun Lin (TW); Roger Tu, Hsin Chu (TW); Yung Chuan Wu, Tao Yuan (TW)

(73) Assignee: Avision Inc., Hsin-Chu (TW)

( * ) Notice: Subject to any disclaimer, the term of this patent is extended or adjusted under 35 U.S.C. 154(b) by 0 days.

(21) Appl. No.: 10/090,854

(22) Filed: Mar. 6, 2002

(65) Prior Publication Data

US 2002/0159123 A1 Oct. 31, 2002

(30) Foreign Application Priority Data

| Apr. 25, 2001 | (TW) | .................. 90206561 U |
| May 11, 2001 | (TW) | .................. 90207841 U |
| Jun. 18, 2001 | (TW) | .................. 90210180 U |

(51) Int. Cl.⁷ ............................................. G02B 26/08
(52) U.S. Cl. ..................................... 359/212; 359/850
(58) Field of Search .................................. 359/850, 857, 359/201, 212; 358/474, 475; 250/208.1

(56) References Cited

U.S. PATENT DOCUMENTS 4,792,826 A * 12/1988 Suzuki ....................... 399/201
5,646,394 A * 7/1997 Steinle et al. ............. 250/208.1

* cited by examiner

*Primary Examiner*—Euncha P. Cherry
(74) *Attorney, Agent, or Firm*—Charles E. Baxley

(57) ABSTRACT

A multiple-resolution scanning device introduces an image information obtained by scanning a document into a light folding device and the image information is reflected in the light folding device. The image information comes out from the light folding device and received and reflected by a final reflection mirror unit, and passes through a lens unit and then focused on an optical sensor. By adjusting the light folding device or the final reflection mirror unit, or by adjusting the light source and the light folding device to change the position or angle thereof to achieve the purpose of changing the path of light of the image information and obtain the scanned results having different resolutions.

15 Claims, 29 Drawing Sheets

MULTIPLE-RESOLUTION SCANNING DEVICE

FIELD OF THE INVENTION

The present invention relates to a scanning device with a multiple-resolution feature which is achieved by changing the light path of the information of an object.

BACKGROUND OF THE INVENTION

There are different requirements for scanning documents and films due to the ranges and the requirements of resolutions are different so that specific document scanners and specific film scanners are developed to meet the requirements.

The trend for the modem scanning devices is to include a higher resolution and a lower resolution in one scanning device. This purpose can be reached by using multiple sets of optical sensors and lenses. The purpose may also be reached by using reflection mirrors and lenses to change the paths of the light, and using masks to obstacle the paths of light and to change the paths of the light.

The devices mentioned employ multiple sets of lenses and sensors and which increase manufacturing cost. The resolution is limited by the number of sets of sensors and lenses so that the present scanners cannot meet the requirements of increase of the resolution for the needs of the market. Therefore, the conventional way by installing multiple sets of sensors and lenses in a scanning device to have a dual-resolution feature cannot catch up the requirements of market.

SUMMARY OF THE INVENTION

The present invention is a multiple-resolution scanning device that changes paths of light to have the multiple-resolution.

The scanning device is embodied as a multiple-resolution scanning device which comprises:

at least one light source which is used to illuminate the documents to be scanned to get the images;

a light folding device having a first reflection mirror and a second reflection mirror which faces the first reflection mirror such that the images introduced by the light folding device is reflected between the first reflection mirror and the second reflection mirror;

a final reflection mirror unit comprising at least one reflection mirror which receives the images coming from the light folding device;

a lens located in the path where the images are reflected from the final reflection mirror unit and focusing on the images;

an optical sensor for receiving the focused images from the lens; and at least one driving device for driving one of the light source, the light folding device, and the final reflection mirror unit so as to change the status of the assembly.

By adjusting the angle or position of the light folding device, or by adjusting the angle or position of the final reflection mirror unit, or by adjusting the positions of the light folding device and the light source simultaneously, the purpose of changing the path of light can be achieved and the scanning device may have a dual-resolution feature.

The present invention will become more obvious from the following description when taken in connection with the accompanying drawings which show, for purposes of illustration only, preferred embodiments in accordance with the present invention.

DETAILED DESCRIPTION OF THE PREFERRED EMBODIMENTS

Figure 1:
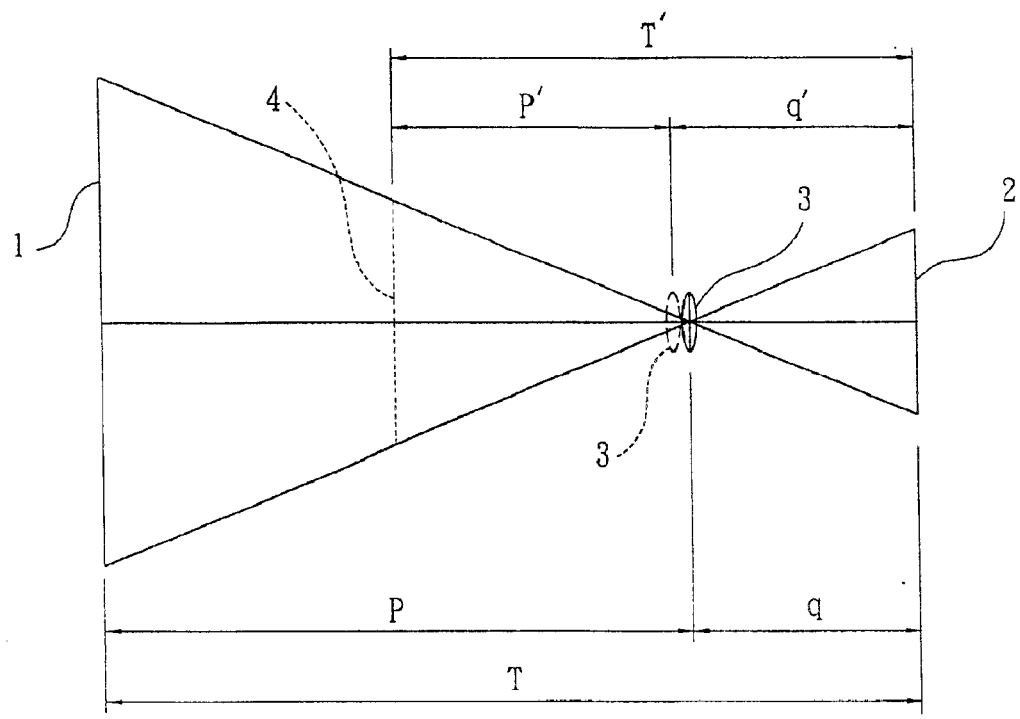
FIG. 1 shows the principle for obtaining an image.

Referring to FIG. 1, the image of the original document 1 is focused onto an optical sensor 2 by a lens 3. The distance between the document 1 and the lens 3 is designated by "p" which means a path of light between the original document 1 and the lens 3. The distance between the images and the lens 3 is designated by "q" which means a path of light between the sensor 2 and the lens 3. The focus of the lens 3 is designated by "f". An equation for obtaining an image is expressed by $1/p+1/q=1/f$.

The definition of magnifying rate is $M=q/p$.

The path of light is designated by $T=p+q$.

Accordingly, the magnifying rate can be increased by shortening "p" or "T".

When "p" is shortened, the image of the original document 4 as shown by dotted lines is focused onto the sensor 2 by the lens 3. The magnifying rate is increased with the shortening of the distance between the original document 4 and the lens 3. In order to meet the equation mentioned above, the distance "q" between the image and the lens 3 has to be adjusted to be "q'" so as to have a better focused result.

The distance "p" is changed to be "q'", and "p'" is less than "p". The distance "q" between the image and the lens 3 is changed to be "q'" (the change between the q and q' is obtained by changing the distance between the lens and the position of the final image, and q' is close to q). The final M' (=q'/p') is larger than the original M (=q/p).

For example, if the original document 1 has an 8-inch width and the sensor 2 has 9600 sensing units, the image information of the 8-inch is recorded into the 9600 sensing units and has a resolution of 1200 dpi. If the original document 4 has a 4-inch width, the image information of the 4-inch width is recorded into the 9600 sensing units to have a resolution of 2400 dpi.

The principle of the present invention is to adjust the light path to increase the magnifying rate M and the resolution, and will be described hereinafter.

Assembly of the First Type

Figure 2:
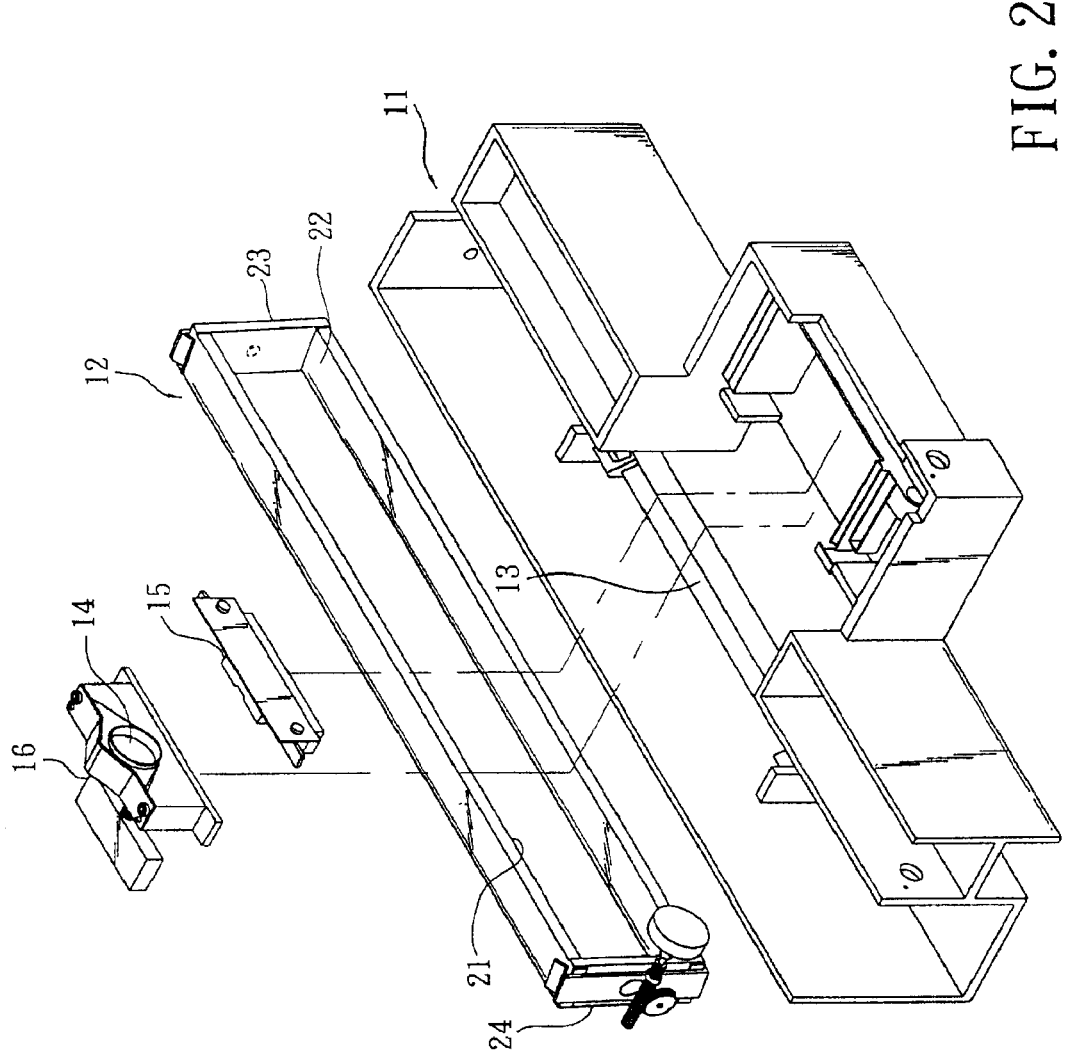
FIG. 2 is an exploded view to show the first type assembly of the present invention.

Referring to FIG. 2, a light folding device 12 and a final reflection mirror unit 13 are connected to a base 11. A lens module 14 and a sensor 15 are located in the light path of the final reflection mirror unit 13. The final reflection mirror unit 13 includes a first reflection mirror 25 which is located beside the light folding device 12.

The lens module 14 is driven by a driving device 16 (which can be a motor or solenoid valve) to move along the path indicated by the arrows.

The light folding device 12 includes a first reflection mirror 21 and a second reflection mirror 22 which is located in opposite to the first reflection mirror 21. Each of the first reflection mirror 21 and the second reflection mirror 22 is composed of a single reflection mirror.

Figure 3:
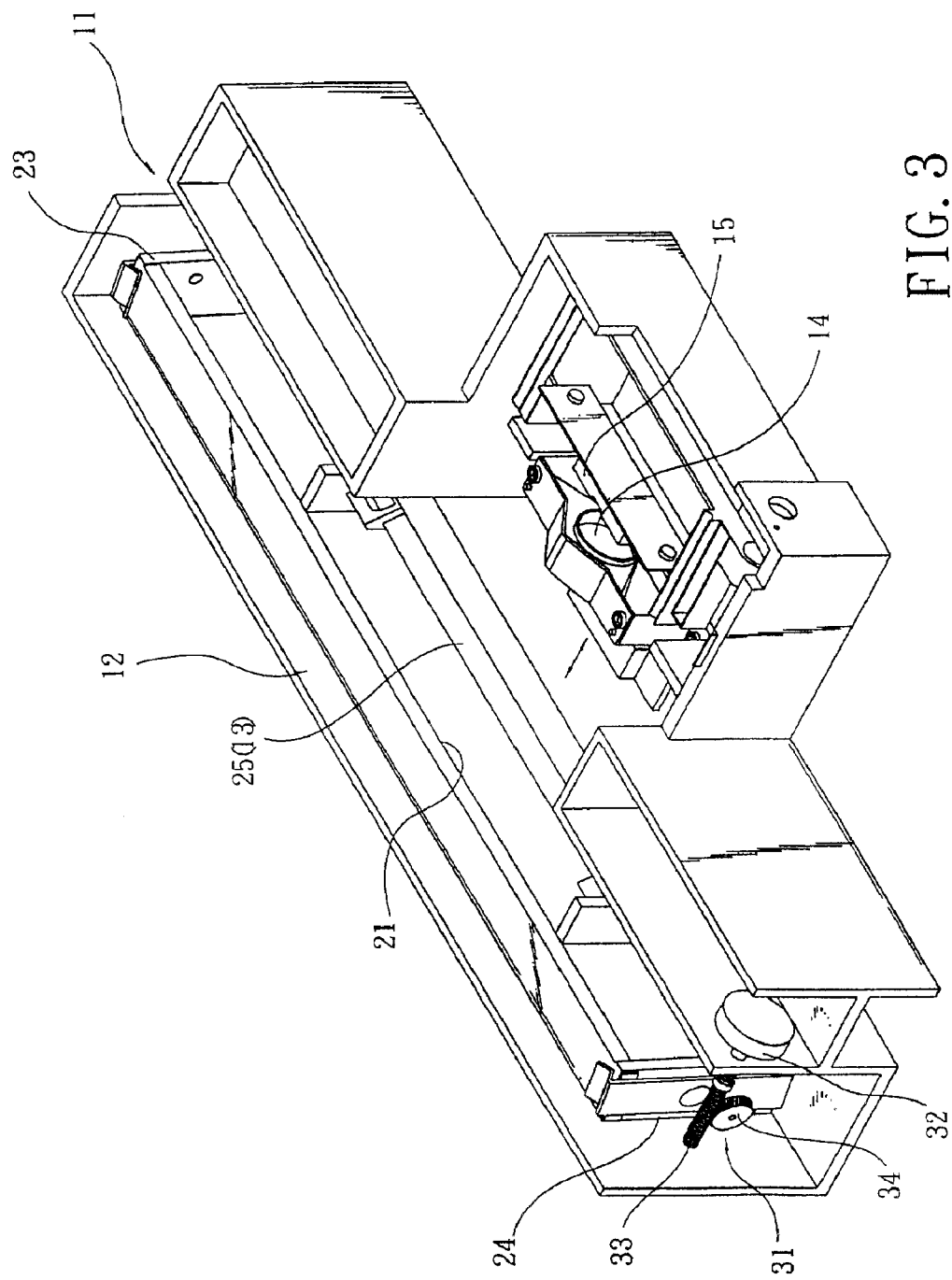
FIG. 3 is a perspective view to show the first type assembly of the present invention.
Figure 4:
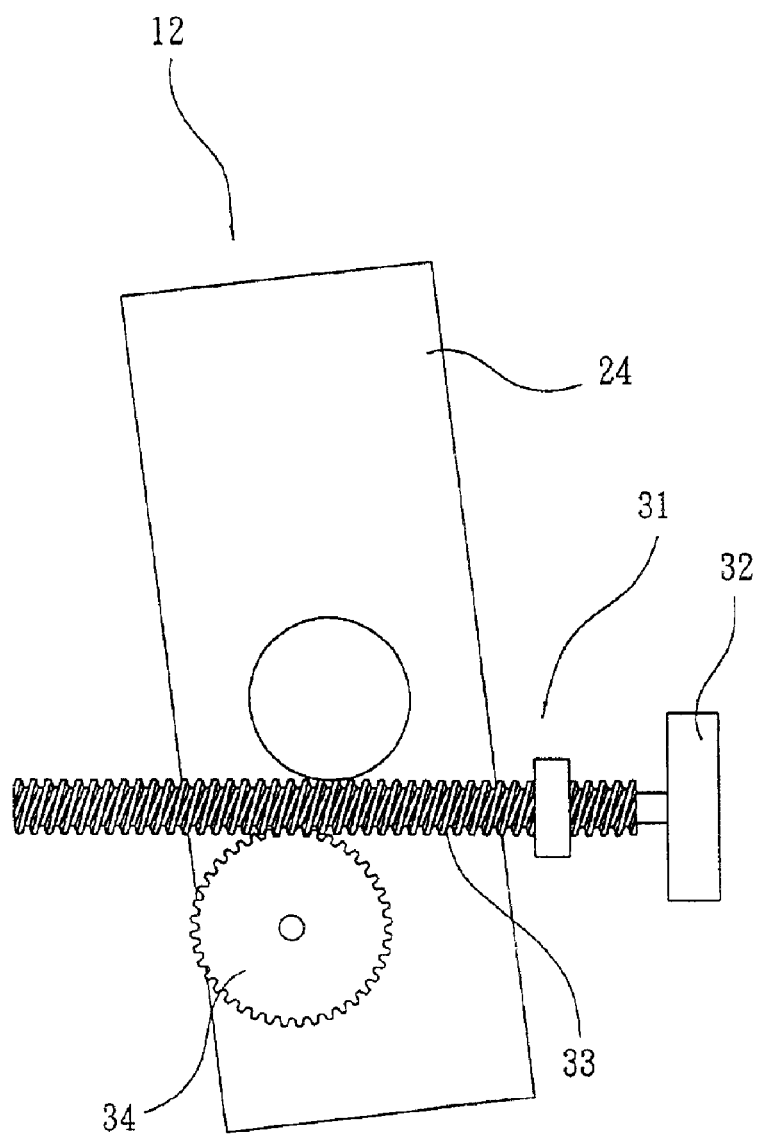
FIG. 4 shows the angle driving device of the first type assembly.

Referring to FIGS. 3 and 4, at the second end 24 of the light folding device 12 is provided an angle driving device 31 which is composed of a power supply member 32 (such as a servo or step motor) for driving a worm rod 33 and a worm wheel 34. The worm wheel 34 is fixed on the second end 24 of the light folding device 12, and the second end 24 is pivotally connected to the base 11. When the worm rod 33 is driven by the power supply member 32, the worm wheel 34 and the light folding device 12 are rotated.

It is to be noted that the angle driving device 31 as shown in FIG. 3 for driving the light folding device 12 can also be replaced with a simple solenoid valve (not shown). The angle driving device 31 may also be connected to the first end 23 of the light folding device 12.

Figure 5:
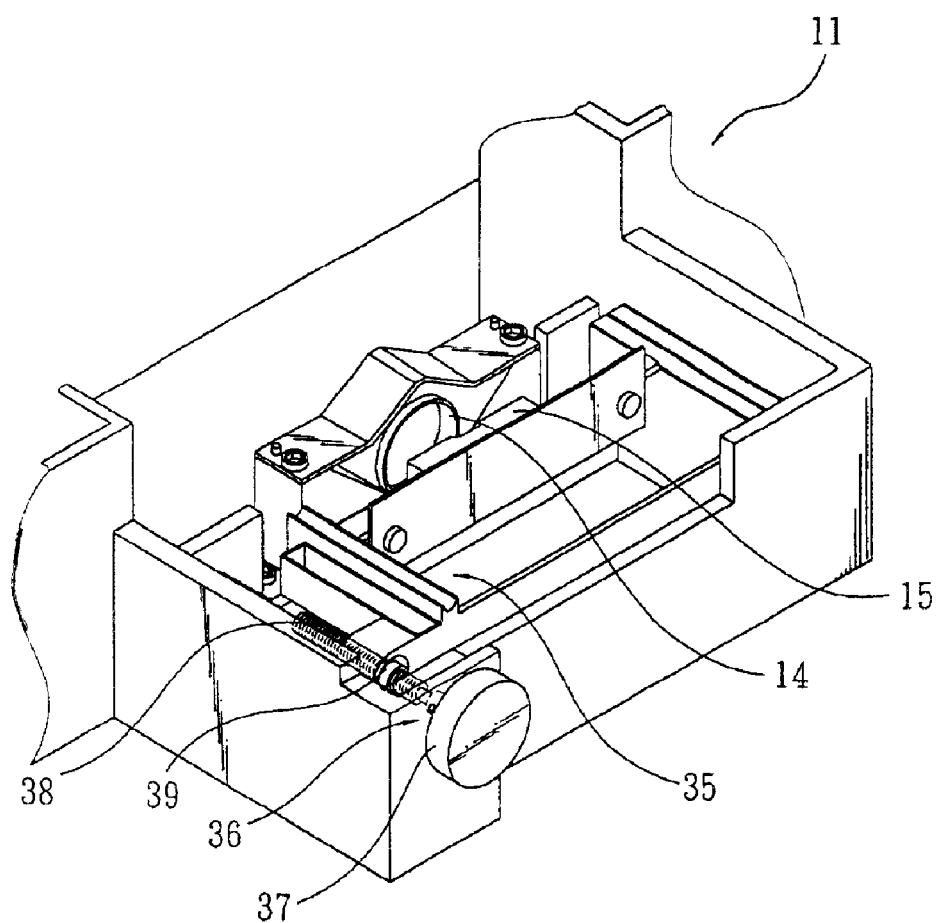
FIG. 5 shows the displacement driving device of the first type assembly.

Referring to FIG. 5, the lens module 14 and the sensor 15 are connected to the base 11 by pair. The lens module 14 is fixed and the sensor 15 is connected to a slide frame 35 with which the sensor 15 is moved.

The slide frame 35 is driven by a displacement driving device 36 which includes a power supply member (such as a servo or step motor), a threaded rod 38 and a nut 39 which is fixed on the slide frame 35. The threaded rod 38 extends through the nut 39 and is driven by the displacement driving device 36. When the threaded rod 38 is rotated by the power supply member 37, the slide frame 35 slides and the sensor 17 can approach to or move away from the lens module 14 so as to change the distance between the sensor 15 and the lens module 14.

The lens module 14 can be movable and is driven by the displacement driving device 36, and the sensor 15 can be fixed. By this arrangement, the purpose of changing the distance between the sensor 15 and the lens module 14 can also be reached.

The First Embodiment of the First Type

Figure 6:
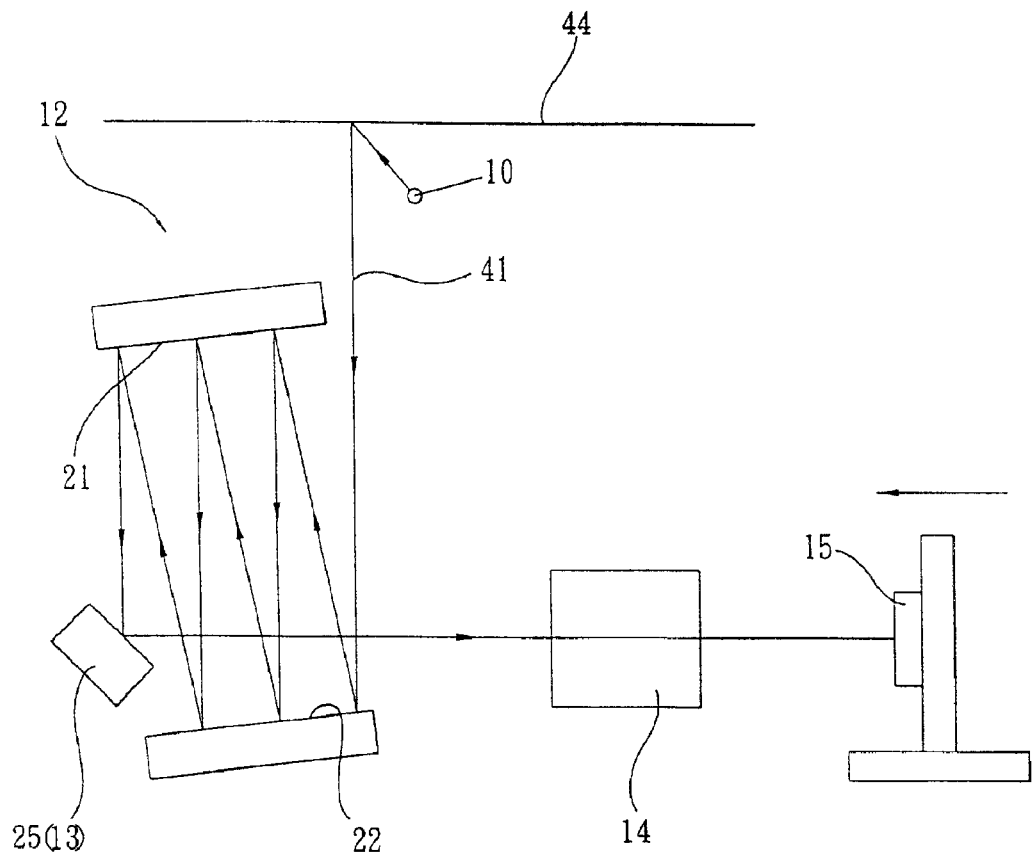
FIG. 6 shows the structure and the path of light of the first type assembly.

FIG. 6 shows the path of light and the structure of the first type of the present invention. The light source 10 lights on document 44 and the optical image obtained by the scanning on the document is defined to be the image information 41 which is introduced into the light folding device 12 and reflected between the first reflection mirror 21 and the second reflection mirror 22 of the light folding device 12.

After the image information 41 passed through the light folding device 12, it is received by the first refection mirror 25 of the final reflection mirror unit 13 and then reflected out. The image information 41 reflected out passes through the lens module 14 and is received by the sensor 15.

The summation of the path of the image information 41 in the light folding device 12 and the path that the image information 41 is reflected from the final reflection mirror 13 to the lens module 14 is defined as "p". The distance between the lens module 14 and the sensor 15 is defined as "q". The focus distance of the lens module 14 is "f".

When the image is clear in the sensor 15, the relationship between the p, q, and f has to meet the limitation of the principle of forming an image. The total path of light $T=p+q$. The rate of magnifying $M=q/p$. In this embodiment, the image information 41 is reflected 6 times in the light folding device 12.

Figure 7:
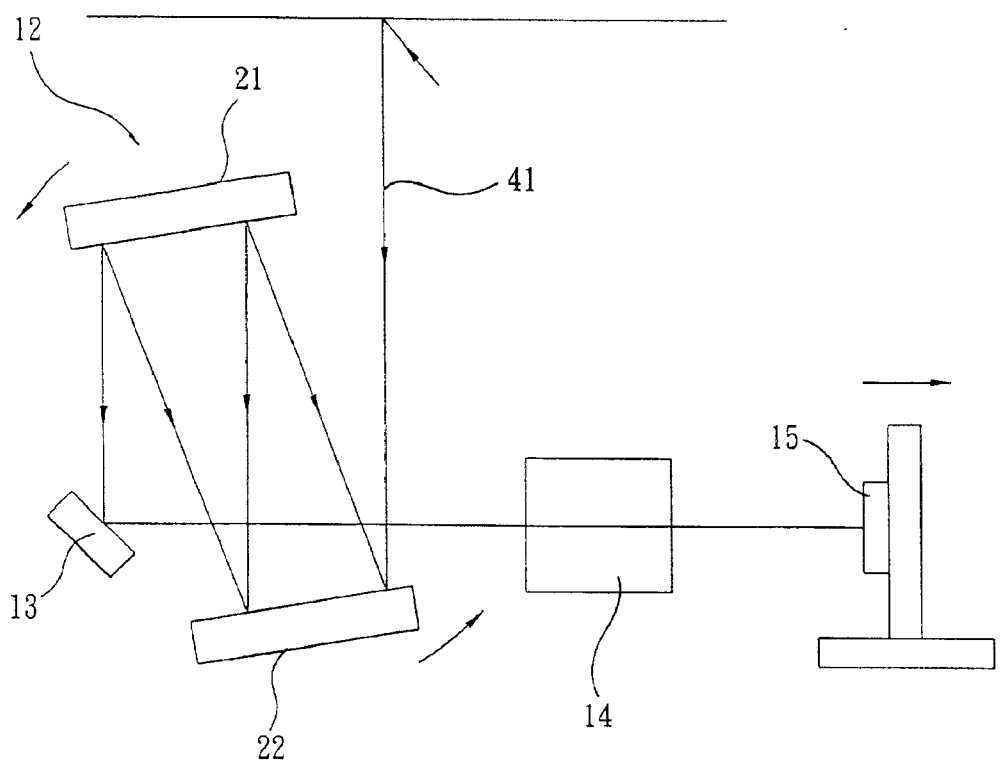
FIG. 7 shows the structure and the path of light when the light folding device is adjusted.

FIG. 7 shows the path of light when the light folding device 12 is adjusted. This is achieved by driving the first reflection mirror 21 and the first reflection mirror 22 of the light folding device 12 by the angle driving device (not shown) respectively.

The image information 41 is received and reflected by the light folding device 12 and the final reflection mirror unit 13. When the sensor 15 gets the clear image, the total path of light T'=p'+q', the rate of magnifying M'=q'/p'. The image information 41 is reflected 4 times in the light folding device 12.

In order to let the image information 41 be precisely focused on the sensor 15, the position of the lens module 14 or the sensor 15 has to be adjusted slightly. In practical use, the adjustment of the value of the q is very minor, the q' after being adjusted is almost the same as the value of the q.

The way of adjusting the value of q is shown in FIGS. 2 and 3. The lens module 14 is driven and moved along the arrows by the driving device 16 which can be a solenoid valve, step motor or other linear driving assembly.

Comparing the results of the FIG. 6 and FIG. 7, the p' that the image information 41 is reflected 4 times is less than the p that the image information 41 is reflected 6 times, and the q' is close to the q. Therefore, the rate of magnifying M' is larger than the M, and the resolution is increased.

The Second Embodiment of the First Type

Figure 8:
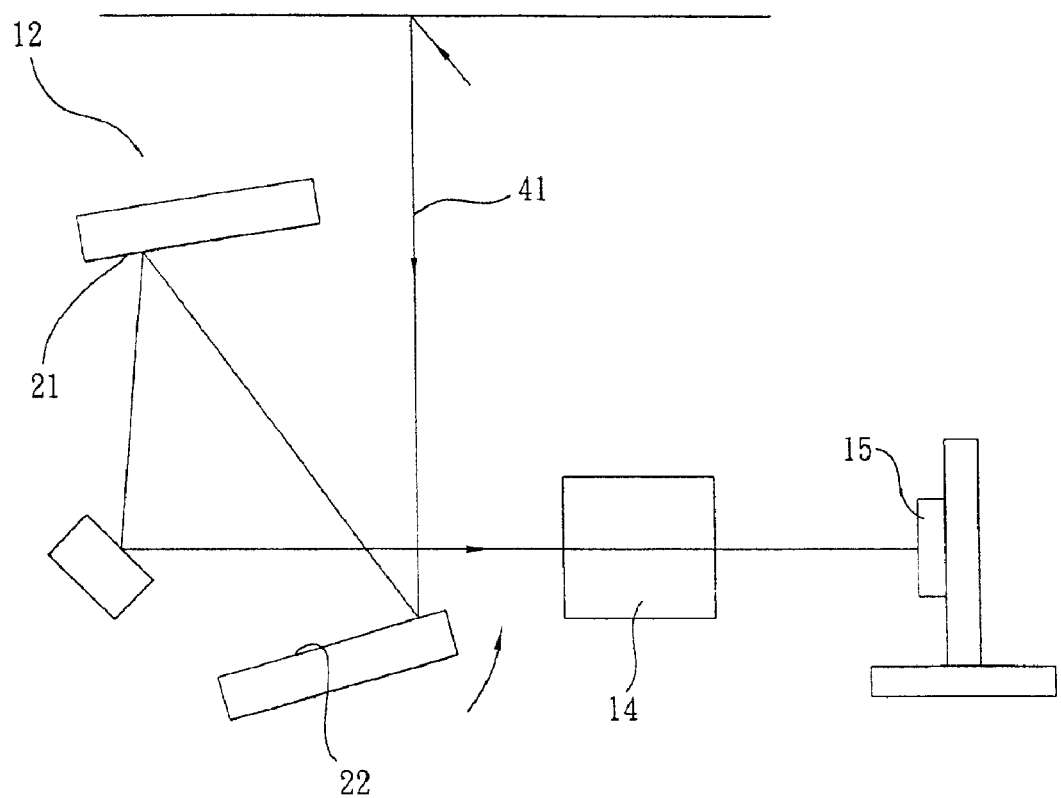
FIG. 8 shows the structure and the path of light when the second reflection mirror of the light folding device is rotated.

FIG. 8 shows the path of light and the structure of the result of rotating the light folding device 12 and the second reflection mirror 22. The second reflection mirror 22 of the light folding device 12 is rotated an angle by the angle driving device (not shown).

After the image information 41 passed through the light folding device 12, the path of the reflection of the image information 41 is changed dramatically when compared with the path in FIG. 6, so that the p is changed. By changing the q or f, we can have the image with different resolutions. The total path of light T"=p"+q", the rate of magnifying M"=q"/p". The image information 41 is reflected 2 times in the light folding device 12. The p" is less than the p', so that the rate of magnifying from the largest to the smallest is M", M' and M.

The Third Embodiment of the First Type

Figure 9:
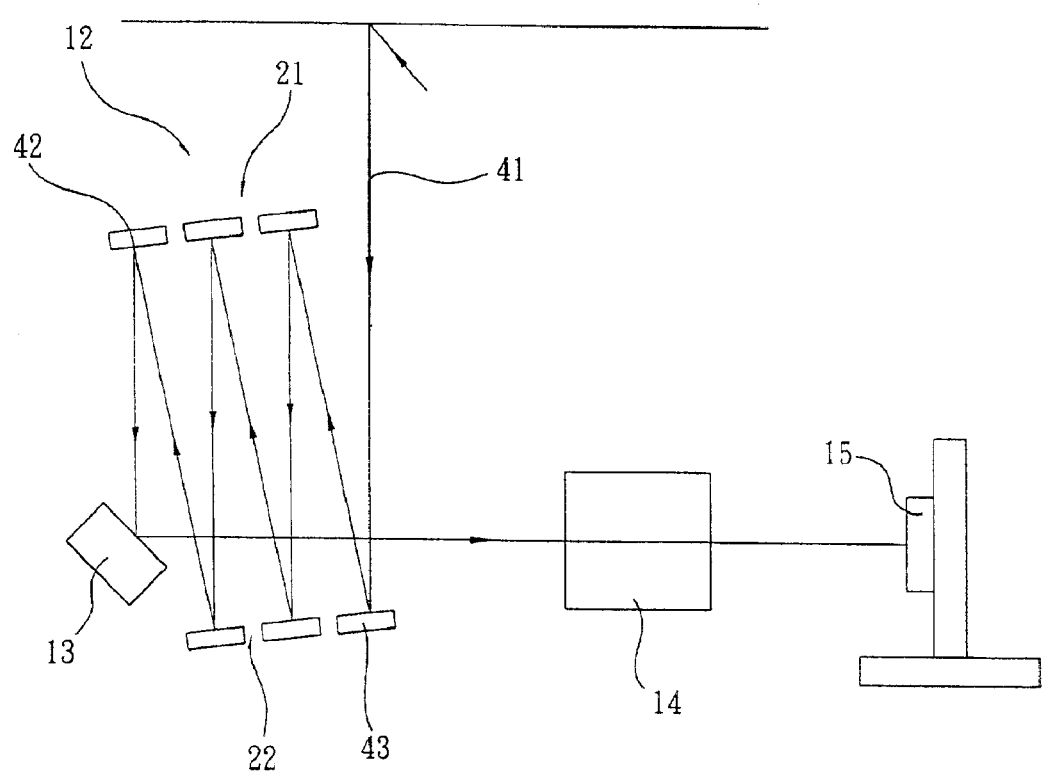
FIG. 9 shows the structure and the path of light of the first type assembly of light folding device which comprises a plurality of sub-reflection mirrors.

FIG. 9 shows the light folding device 12 is composed of multiple sub-reflection mirrors 42, 43 and the path of light thereof. At least one of the sub-reflection mirrors 42, or 43 can be changed its angle or position by cooperating with the angle driving device (not shown) or position driving device (not shown).

When the image information 41 enters in light folding device 12, the image information 41 reflects between the sub-reflection mirrors 42, 43. The value of p is changed by changing the angle or position of at least one of the sub-reflection mirrors 42 or 43, a scanned image with different resolution can be obtained by cooperating with the changes of the value of q or f. It is to be noted that the sub-reflection mirrors 42 and 43 do not have be flat. They can be arranged to obtain the path of light as desired.

Assembly of the Second Type

Figure 10:
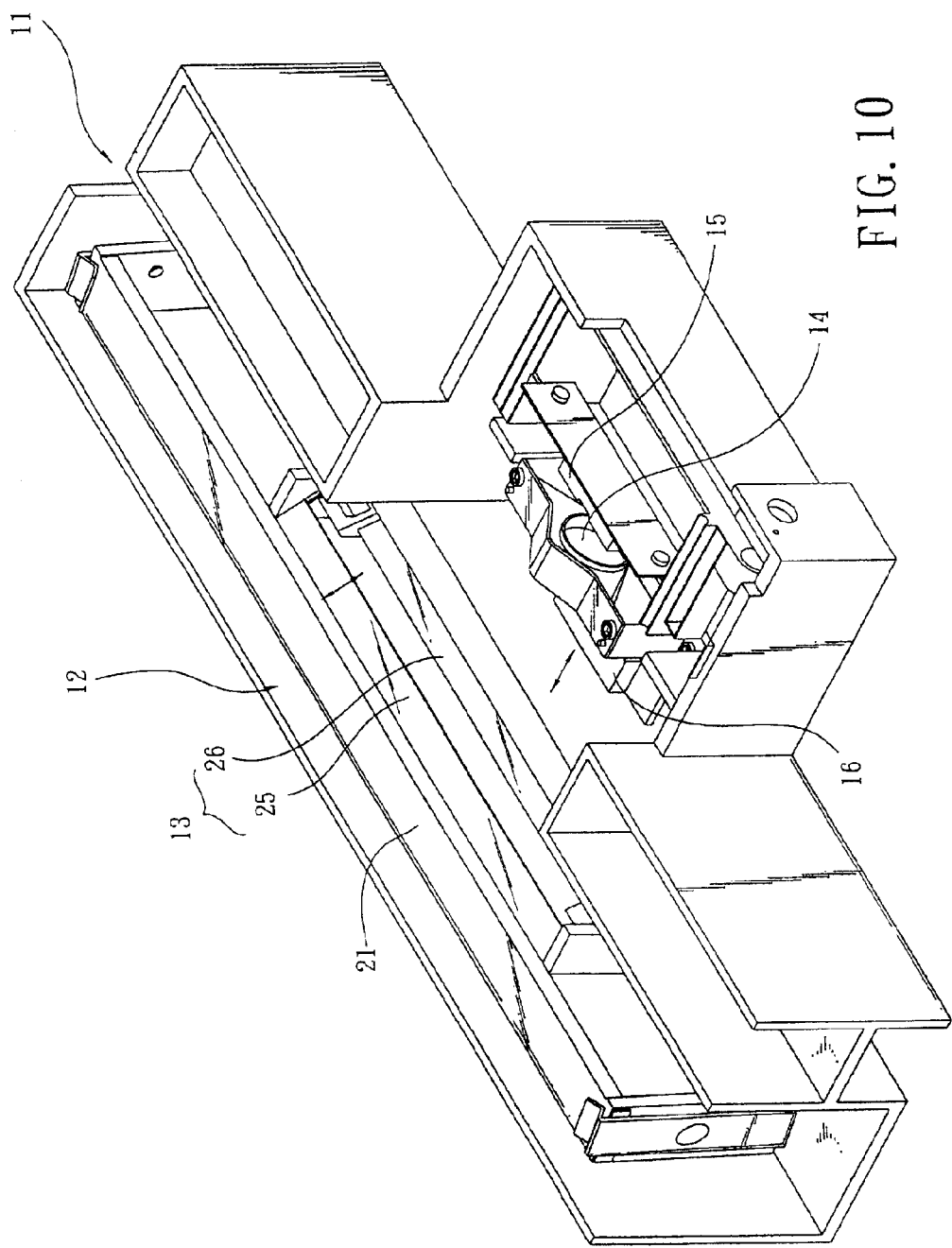
FIG. 10 shows the second type assembly of the present invention.

FIG. 10 shows the assembly of the second type. The assembly includes a base 11 which has a light folding device 12 and a final reflection mirror unit 13. A lens module 14 and a sensor 15 are connected to the light path of the final reflection mirror unit 13. The final reflection mirror unit 13 includes a first reflection mirror 25 and a second reflection mirror 26. The final reflection mirror unit 13 is slightly different from that of the assembly of the first type.

Figure 11:
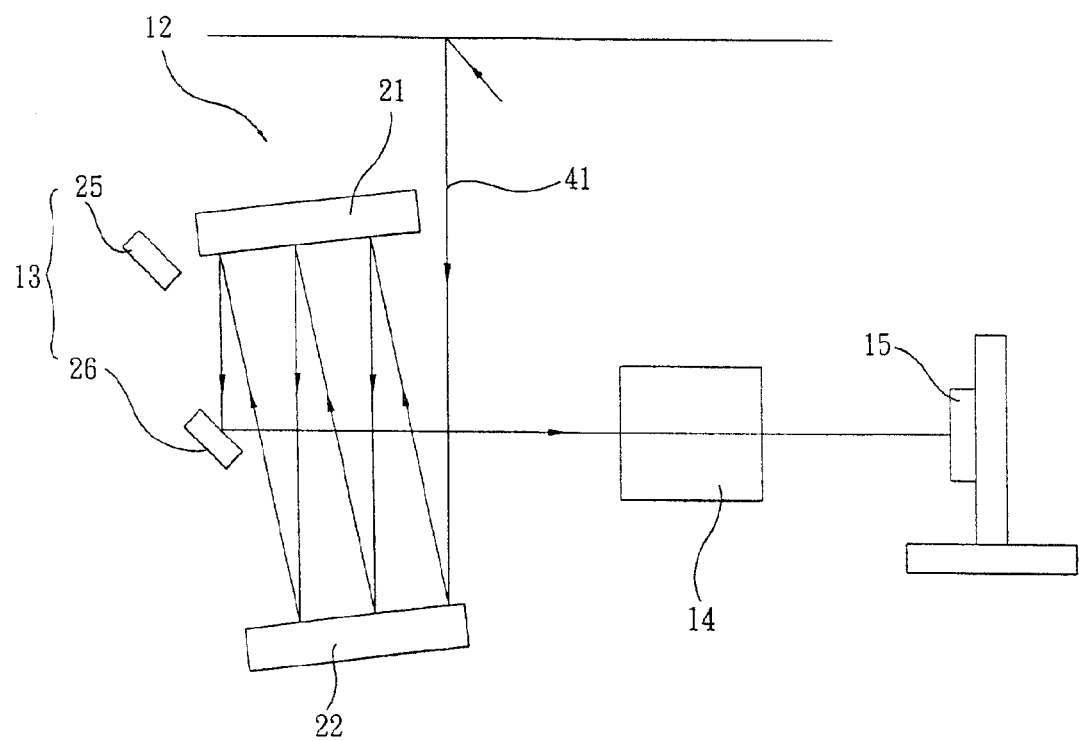
FIG. 11 shows the structure and the path of light of the second type assembly.

FIG. 11 shows the path of light and the structure of the assembly of the second type of the present invention. The final reflection mirror unit 13 includes a first reflection mirror 25 and a second reflection mirror 26. At least one of the first reflection mirror 25 and the second reflection mirror 26 is moved or rotated by a driving means (not shown) so as to change the configuration of the assembly. As shown in the drawing, the image information 41 is reflected 4 times in the light folding device 12. After being reflected, the image information is received by the second reflection mirror 26 of the final reflection mirror unit 13 and sent to the lens module 14.

Figure 12:
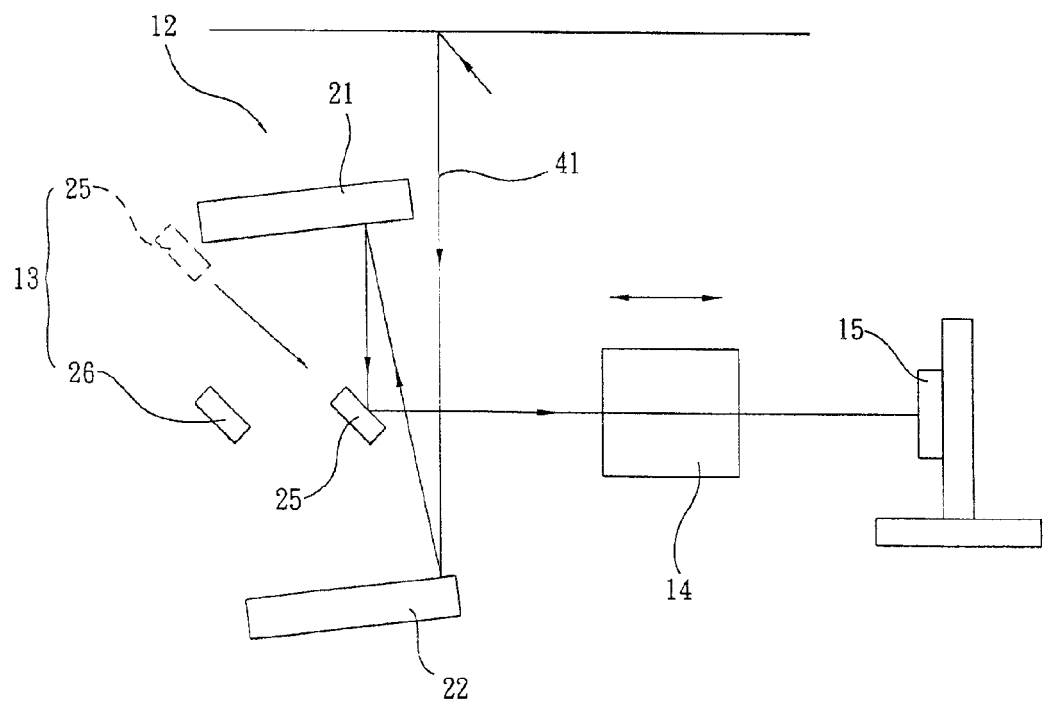
FIG. 12 shows the structure and the path of light when the first reflection mirror of the final reflection mirror unit of the second type assembly is moved.

FIG. 12 shows the path of light and the structure when the first reflection mirror 25 of the final reflection mirror unit 13 is moved. The first reflection mirror 25 of the final reflection mirror unit 13 is moved by the driving device (not shown) into the light folding device 12. By this way, the image information 41 is reflected in the light folding device 12, the image information 41 is received by the first reflection mirror 25 and passes through the lens module 14. The image information 41 is reflected 2 times in the light folding device 12.

Comparing the path of light shown in the FIGS. 11 and 12, the value of p when the image information 41 is reflected 2 times is less than the value of p when the image information 41 is reflected 6 times. The value of q after being adjusted is close to the value of the original q. The rate of magnifying increases when the value of p decreases.

The Second Embodiment of the Second Type

Figure 13:
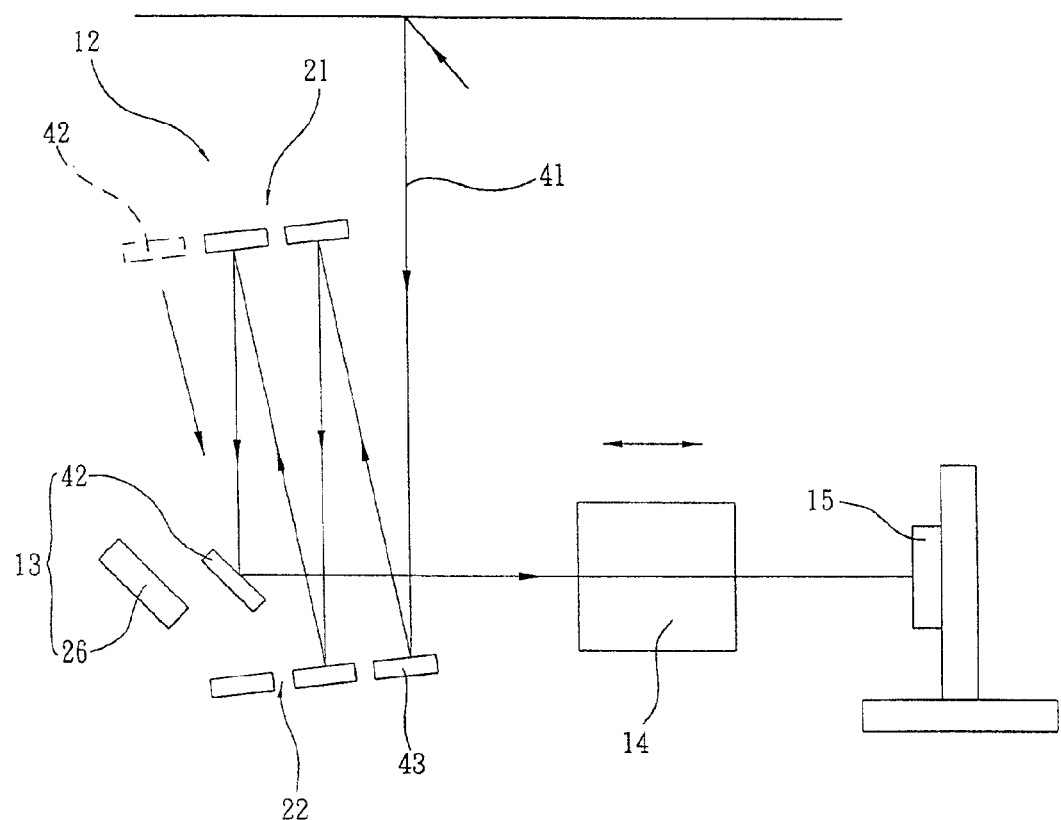
FIG. 13 shows the structure and the path of light when one of the reflection mirrors of the light folding device of the second type assembly is deemed as a part of the final reflection mirror unit.

FIG. 13 shows that one of the sub-reflection mirrors 42 in the light folding device 12 is deemed to be a part of the final reflection mirror unit 13, and the structure and the path of light are shown in this figure. The first reflection mirror 21 and the second reflection mirror 22 of the light folding device 12 are respectively composed of a plurality of sub-reflection mirrors 42, 43. One of the sub-reflection mirror 42 of the first reflection mirror unit 21 and the second reflection mirror 26 are cooperated to be the final reflection mirror unit 13. When the sub-reflection mirror 42 is located on a top of the light folding device 12 as shown in dotted lines, the image information 41 is reflected 6 times in the light folding device 12 (not shown).

When the sub-reflection mirror 42 is driven by the driving device (not shown) to a position in front of the second reflection mirror 26, the sub-reflection mirror 42 is rotated and the image information 41 is reflected in the light folding device 12. The image information 41 is received in the shifted sub-reflection mirror 42 and reflected to and passes through the lens unit 14 and then is received by the sensor 15. The image information 41 is reflected 4 times in the light folding device 12. Accordingly, the rate of magnifying can be increased by adjusting the position and the angle of the sub-reflection mirror 42.

The Third Embodiment of the Second Type

Figure 14:
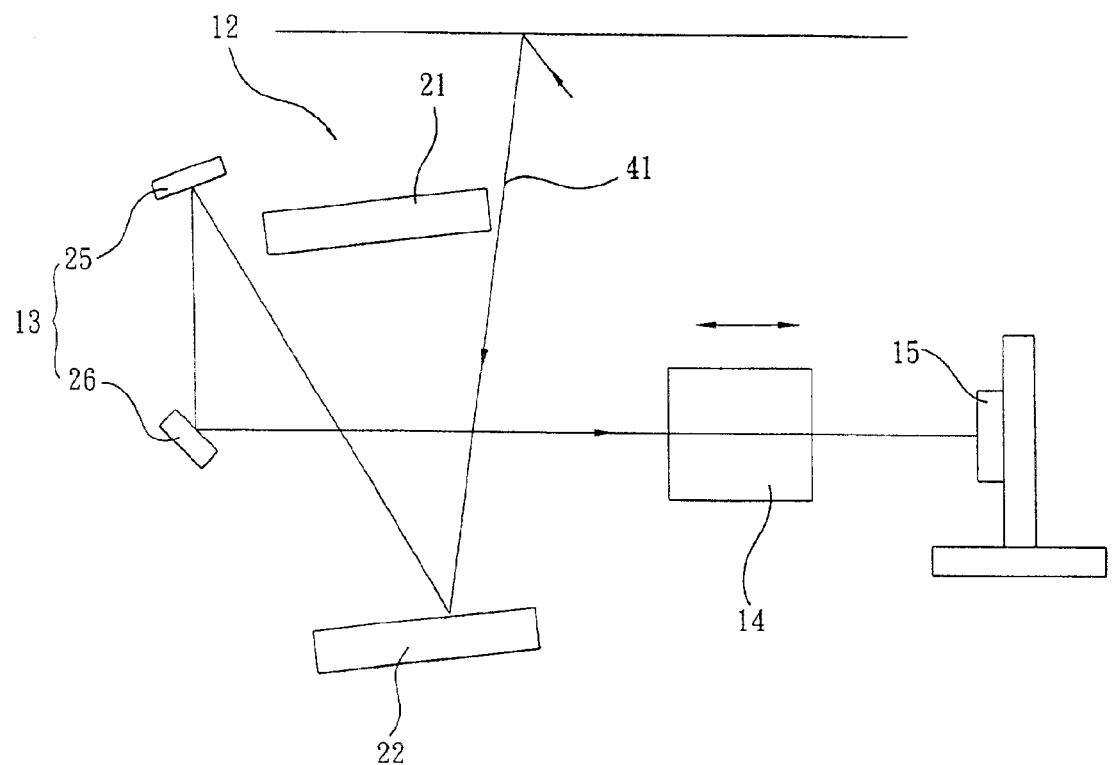
FIG. 14 shows the structure and the path of light of the second reflection mirror of the final reflection mirror unit of the second type assembly.

FIG. 14 shows the structure and the path of light after the second reflection mirror 26 of the final reflection mirror unit 13 is adjusted. This arrangement is to move the second reflection mirror 26 away from the light folding device 12.

After the image information 41 is reflected in the light folding device 12, the image information 41 is received by the fixed first reflection mirror 25 and then reflected to the second reflection mirror 26. The image information 41 then passes through the lens unit 14 and is received by the sensor 15.

Comparing the results in FIGS. 11 and 14, the path of light of the image information 41 in FIG. 11 does not reach to the first reflection mirror 25. However, the path of light of the image information 41 in FIG. 14 reaches to the first reflection mirror 25 and the second reflection mirror 26. The image information 41 then passes through the lens unit 14 and becomes an image on the sensor 15. It is to be noted that the image information 41 in FIG. 11 is different from that in FIG. 14.

The image information 41 is reflected 6 times in the light folding device 12 before the final reflection mirror unit 13 is adjusted, and the image information 41 is reflected 1 time in the light folding device 12 after the final reflection mirror unit 13 is adjusted. Therefore, the rate of magnifying can be increased.

Figure 15:
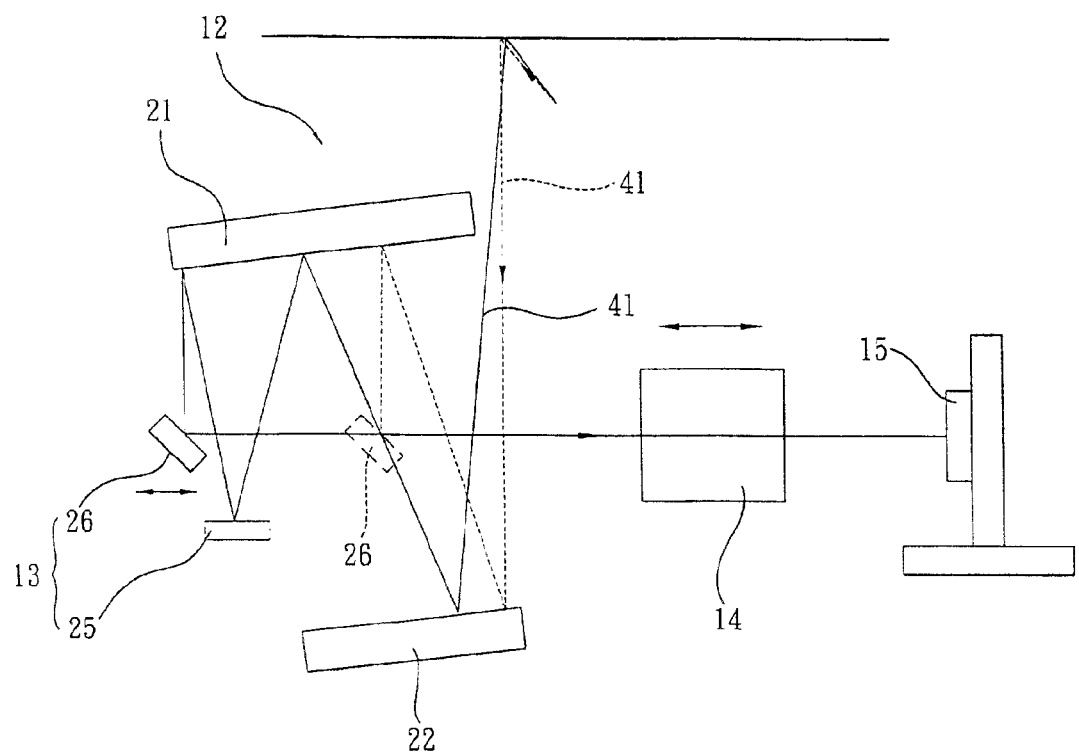
FIG. 15 shows an equivalent of the structure as shown in FIG. 14.

FIG. 15 shows an equivalent of the embodiment. The first reflection mirror 25 of the final reflection mirror unit 13 is fixedly connected to a side of the light folding device 12 and located adjacent to the second reflection mirror unit 22 and the second reflection mirror 26 of the final reflection mirror unit 13. The second reflection mirror 26 of the final reflection mirror unit 13 is able to be driven by the driving device (not shown) and receives the image information 41 as shown in dotted lines. In this situation, the image information 41 does not reach to the first reflection mirror 25.

It is advantageous that when designing the device, the first reflection mirror 25 can be first fixed by referencing the factors and is cooperated with the movable second reflection mirror 26. There will be more flexibility while the resolution is adjusted from 1200 dpi to 1800 dpi, 2400 dpi or 3600 dpi.

The Fourth Embodiment of the Second Type

Figure 16:
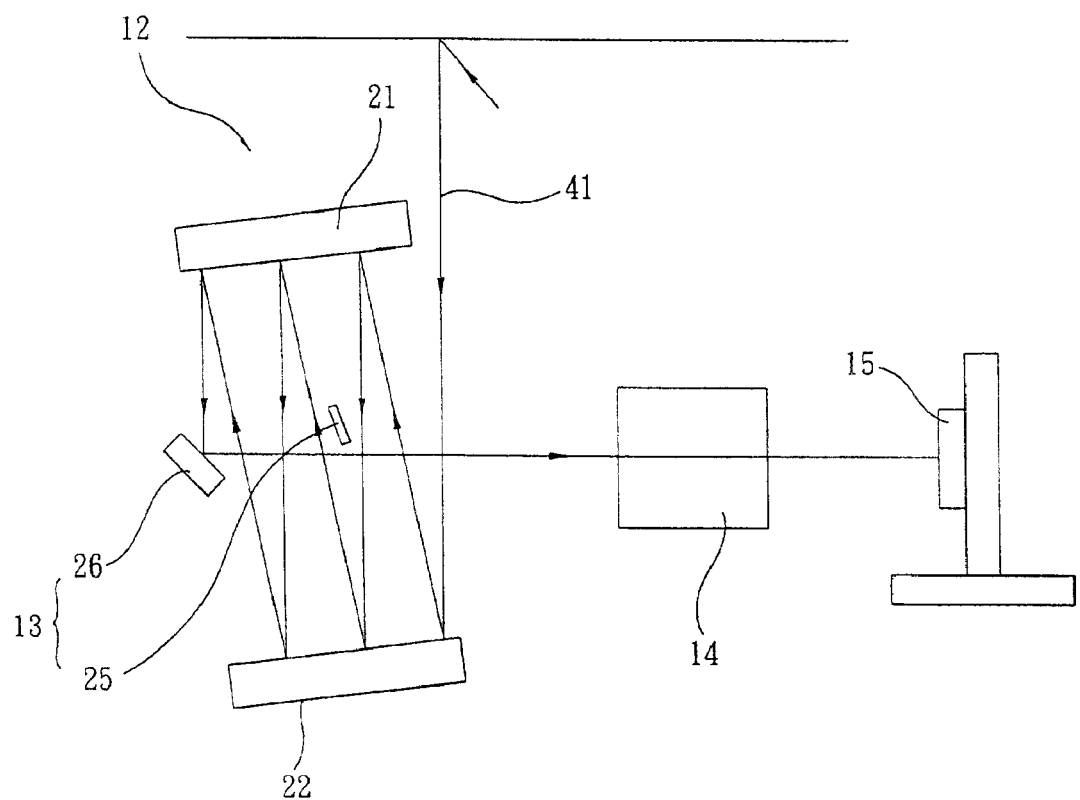
FIG. 16 shows the structure and the path of light of the first reflection mirror of the final reflection mirror unit in the light folding device.

FIG. 16 shows the structure and the path of light after the first reflection mirror 25 of the final reflection mirror unit 13 is located in the light folding device 12. The first reflection mirror 25 is located in the light folding device 12, it is located at an angle that the image information 41 will not be reflected to the lens unit 14. The image information 41 is reflected 6 times in the light folding device 12, and is received and reflected by the second reflection mirror 26.

Figure 17:
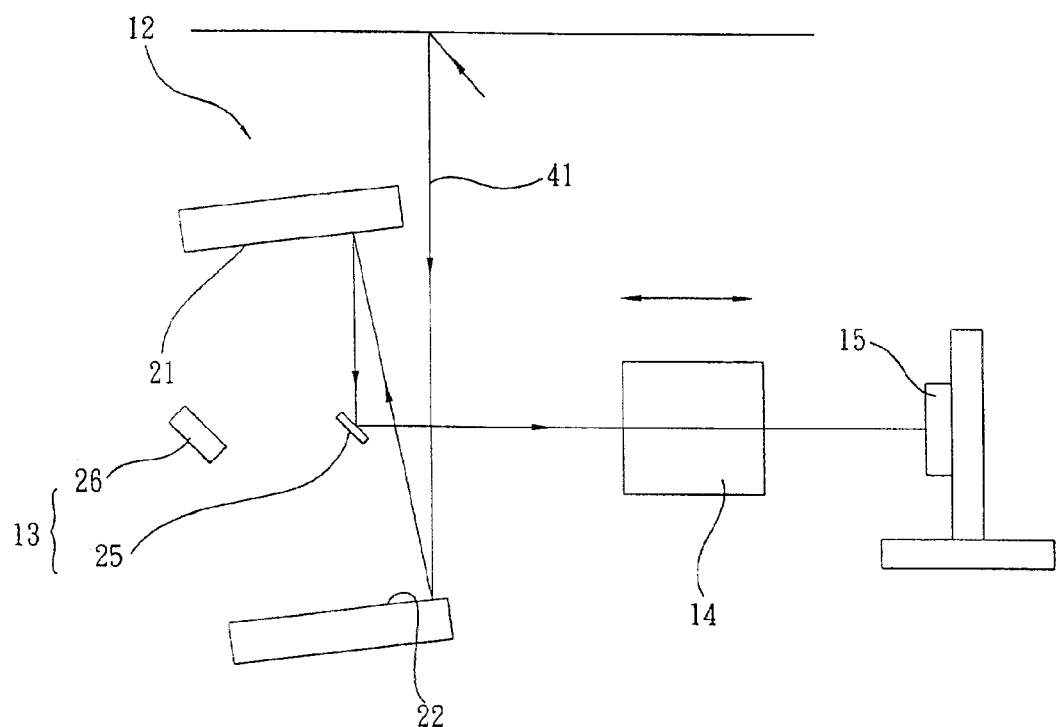
FIG. 17 shows the structure and the path of light when the first reflection mirror of the second type assembly is rotated.

FIG. 17 shows the structure and the path of light after the first reflection mirror 25 is rotated. The image information 41 is reflected between the first reflection mirror 21 and the second reflection mirror 22 of the light folding device 12. Due to the first reflection mirror 25 is rotated an angle, the image information 41 is reflected in the light folding device 12 and reaches to the first reflection mirror 25 but not to the second reflection mirror 26. The image information 41 is only reflected 2 times in the light folding device 12.

The value p after the 2-time reflection in the light folding device 12 is obviously less than that after 6-time reflection. Therefore, under the situation that the value of q is almost not changed, the rate of magnifying with a smaller value of p can be increased.

The Fifth Embodiment of the Second Type

Figure 18:
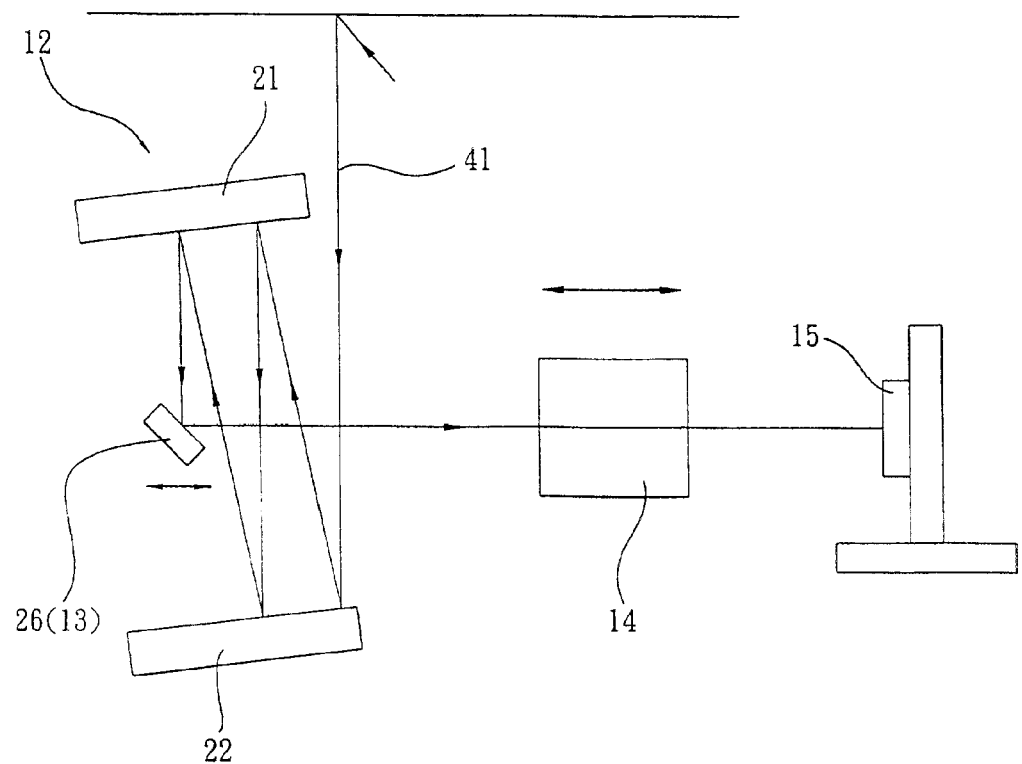
FIG. 18 shows the structure and the path of light wherein the final reflection mirror unit of the second type assembly is a movable reflection mirror.

FIG. 18 shows the structure and the path of light when the final reflection mirror unit 13 is a movable second reflection mirror 26. The second reflection mirror 26 can be driven horizontally by a driving device (not shown). After the image information 41 in the light folding device 12 is reflected 4 times, the image information 41 is received by the second reflection mirror 26 and passes through the lens unit 14. The image information 41 is focused in the lens unit 14 and passed to the sensor 15.

Figure 19:
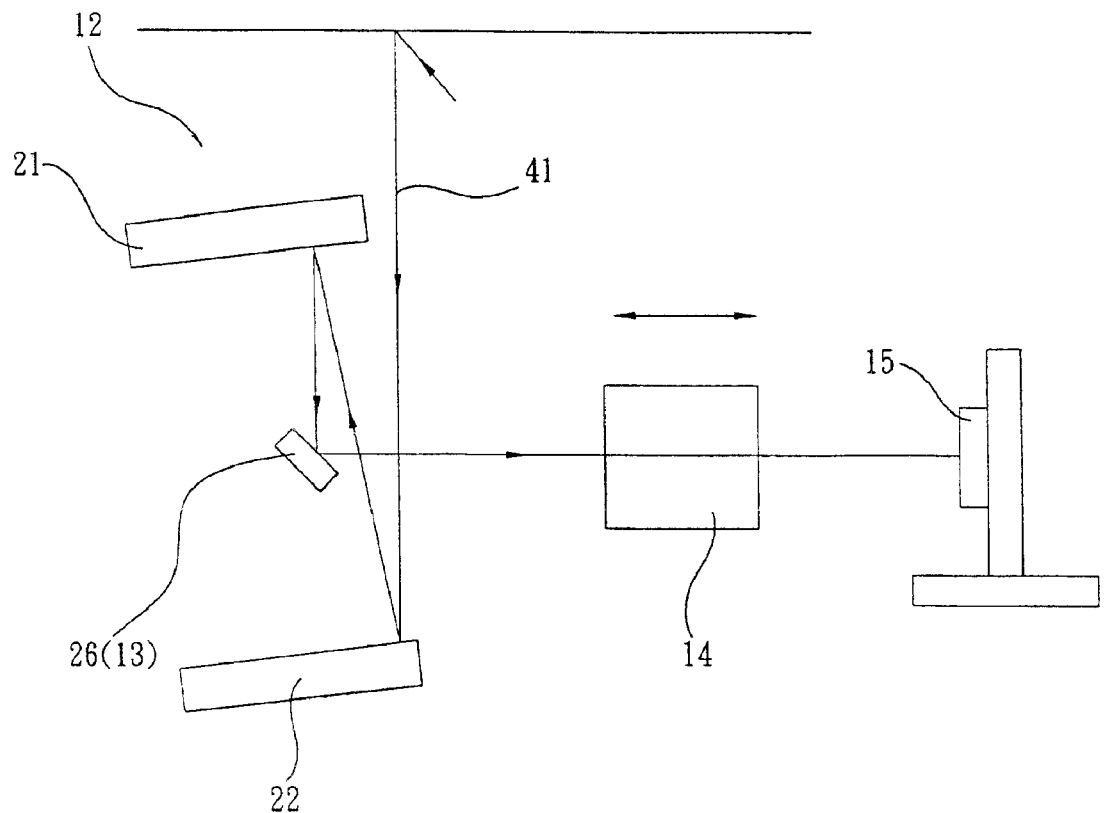
FIG. 19 shows the structure and the path of light when the reflection mirror of the second type assembly is moved toward the lens unit.

FIG. 19 shows the structure and the path of light after the second reflection mirror 26 is moved toward the lens unit 14. The image information 41 obtained by scanning the document is introduced in the light folding device 12. The second reflection mirror 26 is moved toward the lens unit 14 by a driving device (not shown). The image information 41 reflected twice between the first reflection mirror 21 and the second reflection mirror 26 of the light folding device 12 is received by the second reflection mirror 26, and the image information 41 passes the lens unit 14 and is received by the sensor 15.

The value p after the 2-time reflection in the light folding device 12 is obviously less than that after 4-time reflection. Therefore, under the situation that the value of q is not changed, the rate of magnifying can be increased by moving the second reflection mirror 26.

The Sixth Embodiment of the Second Type

Figure 20:
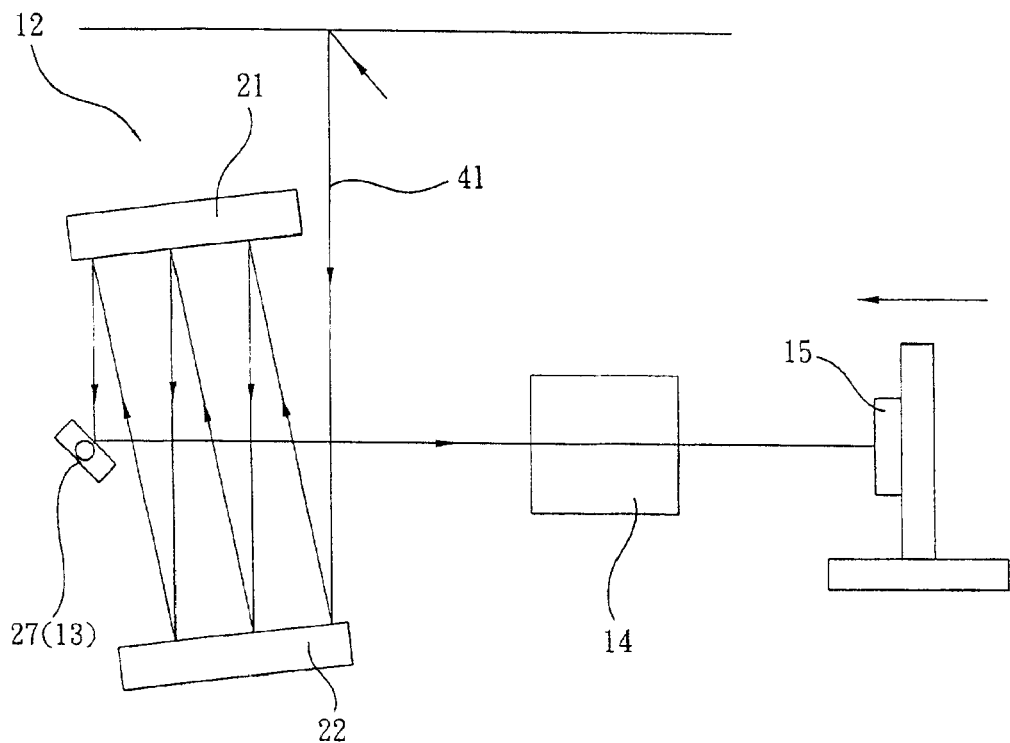
FIG. 20 shows the structure and the path of light wherein the final reflection mirror unit of the second type assembly is rotatable.

FIG. 20 shows the structure and the path of light when the final reflection mirror unit 13 is a rotatable reflection mirror 27. The reflection mirror 27 is driven by an angle driving device (not shown) so as to perform different angular status. The image information 41 obtained by scanning the document is introduced in the light folding device 12. The image information 41 is reflected 6 times in the light folding device 12 and is received by the reflection mirror 27 and passes through the lens unit 14 and received by the sensor 15.

Figure 21:
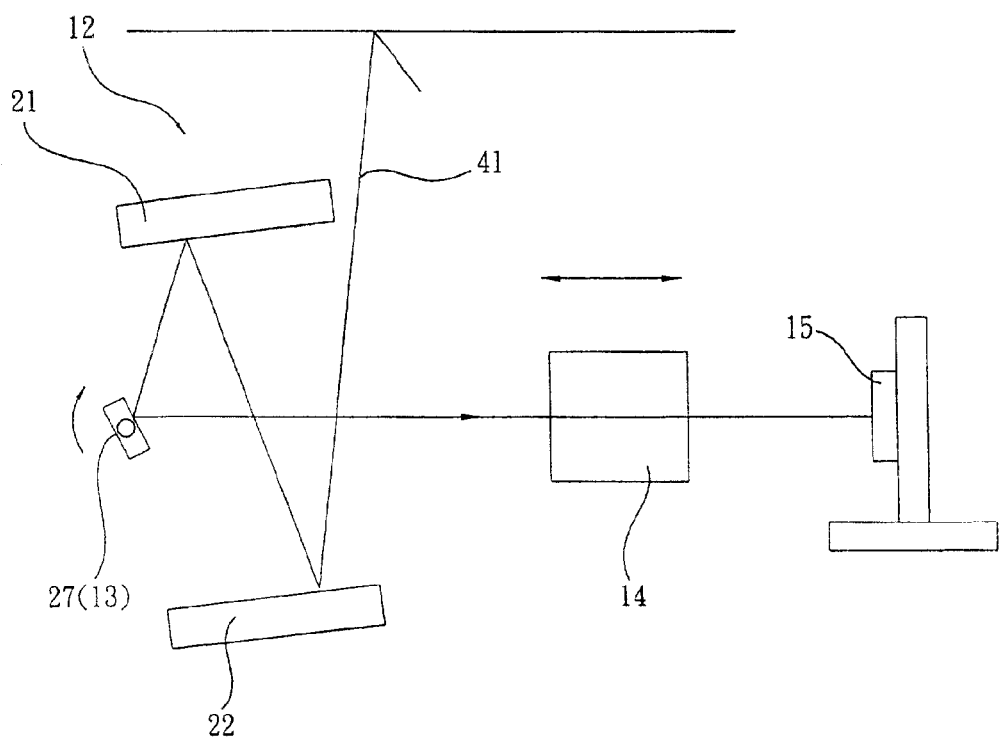
FIG. 21 shows the structure and the path of light when the reflection mirror of the second type assembly is rotated an angle.

FIG. 21 shows the structure and the path of light when the reflection mirror 27 is rotated an angle such that the path of light of the image information 41 in FIG. 20 does not reach to the lens unit 14 via the reflection mirror 27.

Instead, another path of light of the image information 41 is reflected in the light folding device 12. The path of light is received by the reflection mirror 27 and passes through the lens unit 14 and received by the sensor 15. The image information 41 is reflected 2 times in the light folding device 12.

Therefore, the value of p when the image information 41 is reflected 2 times in the light folding device 12 is less than the value of p when the number of reflection is 6. Under the condition that the value of q is not changed, the rate of magnifying can be increased by rotating the reflection mirror 27.

Assembly of the Third Type

Figure 22:
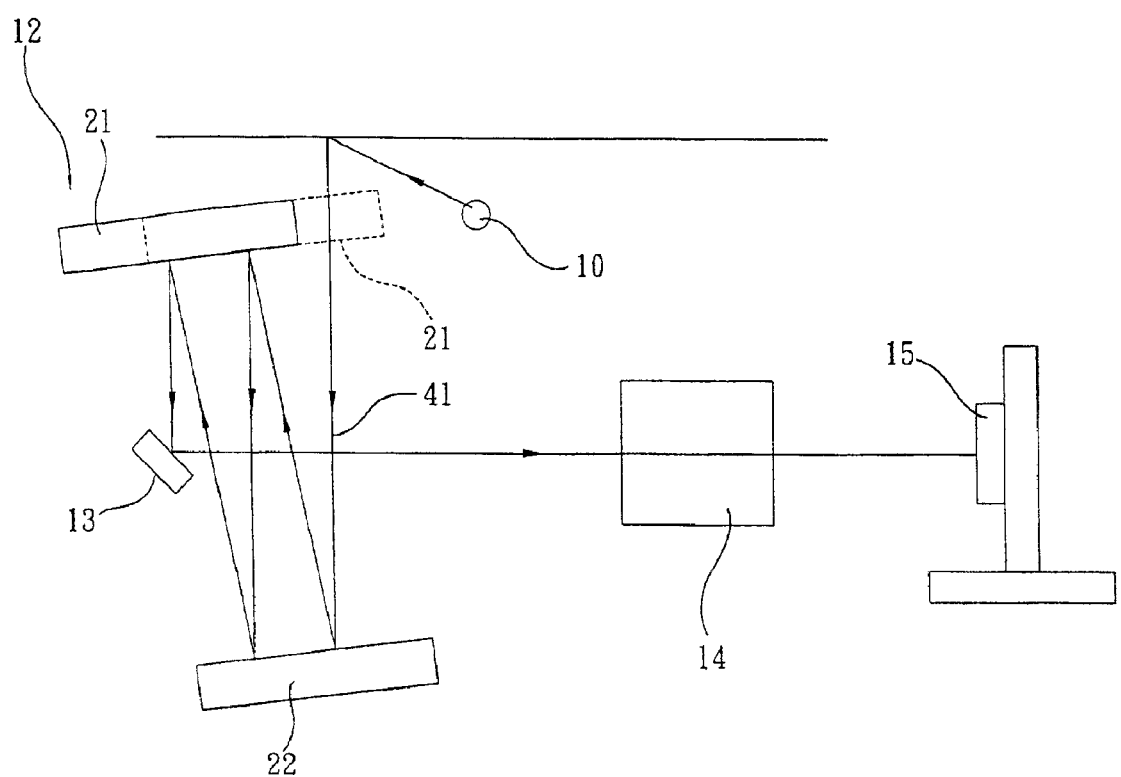
FIG. 22 shows the structure and the path of light of the third type assembly.

FIG. 22 shows the structure and the path of light of the third type assembly. The difference between the first type is that the first reflection mirror 21 of the light folding device 12 can be moved.

Figure 24:
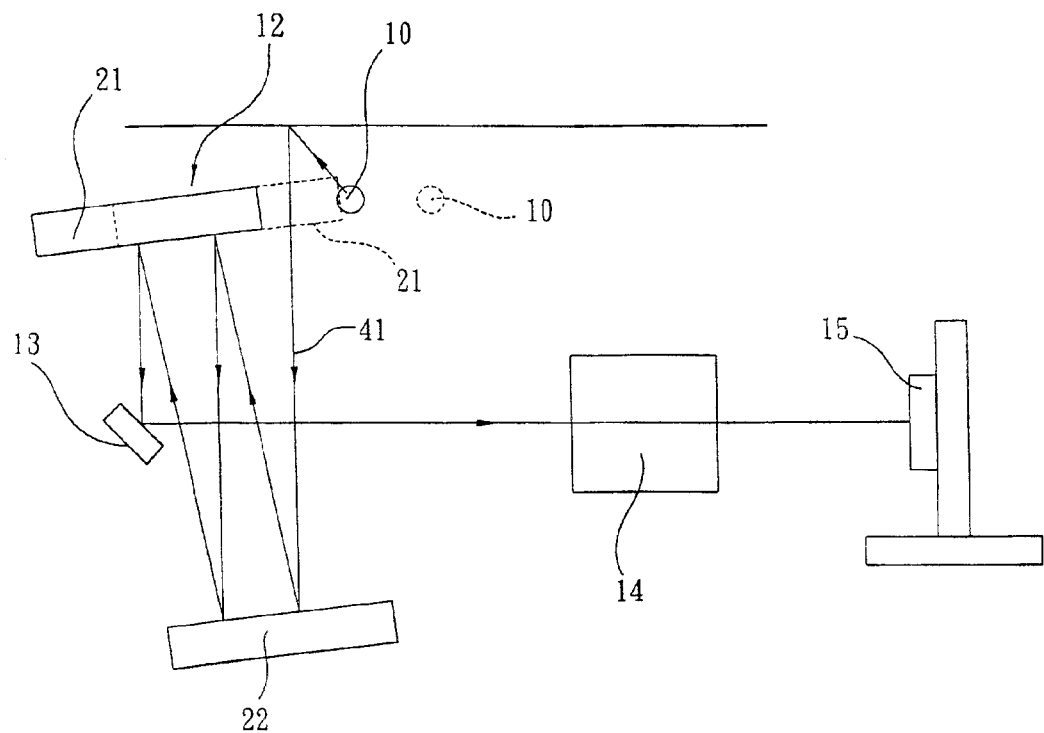
FIG. 24 shows another embodiment of the third type assembly of the present invention.

FIG. 24 shows the structure and the path of light of the third type. The difference between the first type is that the first reflection mirror 21 of the light folding device 12 can be moved.

The First Embodiment of the Third Type Assembly

Referring to FIG. 22, the first reflection mirror 21 is moved away from the light source 10 which is not movable (from the position shown in dotted lines to the position shown in solid lines). The image information 41 is reflected 4 times in the light folding device 12, and is finally reflected by the final reflection mirror unit 13 to the lens unit 14 and become an image in the sensor 15. The final reflection mirror unit 13 is a single reflection mirror.

Figure 23:
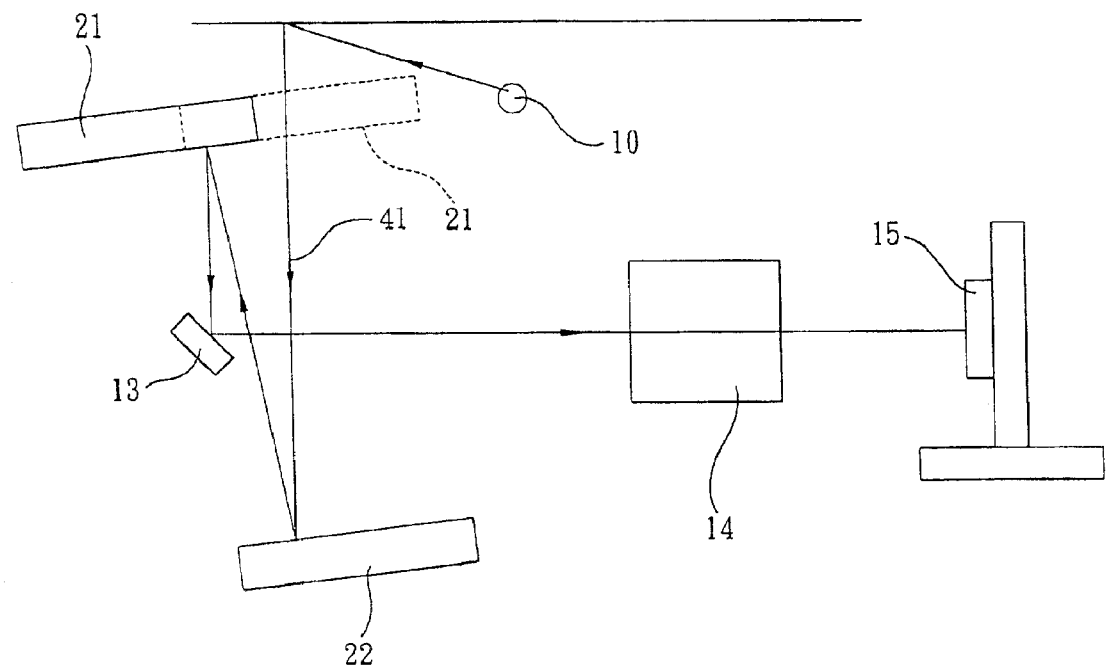
FIG. 23 shows the structure and the path of light when the first reflection mirror of the third type assembly is moved away from the light source.

FIG. 23 shows the structure and the path of light when the first reflection mirror 21 is moved further away from the light source 10. The first reflection mirror 21 is moved further away from the light source 10 which is not movable (from the position shown in dotted lines to the position shown in solid lines). The image information 41 is reflected 2 times in the light folding device 12, and is finally reflected by the final reflection mirror unit 13 to the lens unit 14 and become an image in the sensor 15.

Comparing the results of FIGS. 22 and 23, the farther the first reflection mirror 21 is away from the light source 10, the number of times of reflection of the image information 41 between the first reflection mirror 21 and the second reflection mirror 22 is less. The value of p due to the reflection of the image information becomes smaller. Under the condition that the value of p is reduced and the value of q is increased, moving the first reflection mirror 21 away from the light source 10 causes a larger resolution and rate of magnifying.

Comparing the results of FIGS. 22 and 23, the image information 41 in those two situations is different, due to the scattering of the light on the scanned document, when the illumination condition is accepted, different paths of light of the image information 41 may have clear scanning result.

The Third Embodiment of the Second Type Assembly

Referring to FIG. 24, the light source 10 and the light folding device 12 are movable from the position shown in dotted lines to the position shown in solid lines. For example, the first reflection mirror 21 of the light folding device 12 can be made to be movable and the light source 10 is also movable. The first reflection mirror 21 and the light source 10 can be fixed on the same base (not shown).

When the first reflection mirror 21 and the light source 10 are moved, the first reflection mirror 21 and the light source 10 are moved relative to the second reflection mirror 22, so that the relative position between the light folding device 12 and the light source 10 can be accordingly adjusted. The image information 41 is reflected 4 times between the first reflection mirror 21 and the second reflection mirror 22 of the light folding device 12. The image information 41 is finally received and reflected by the final reflection mirror unit 13 and becomes an image on the sensor 15.

Figure 25:
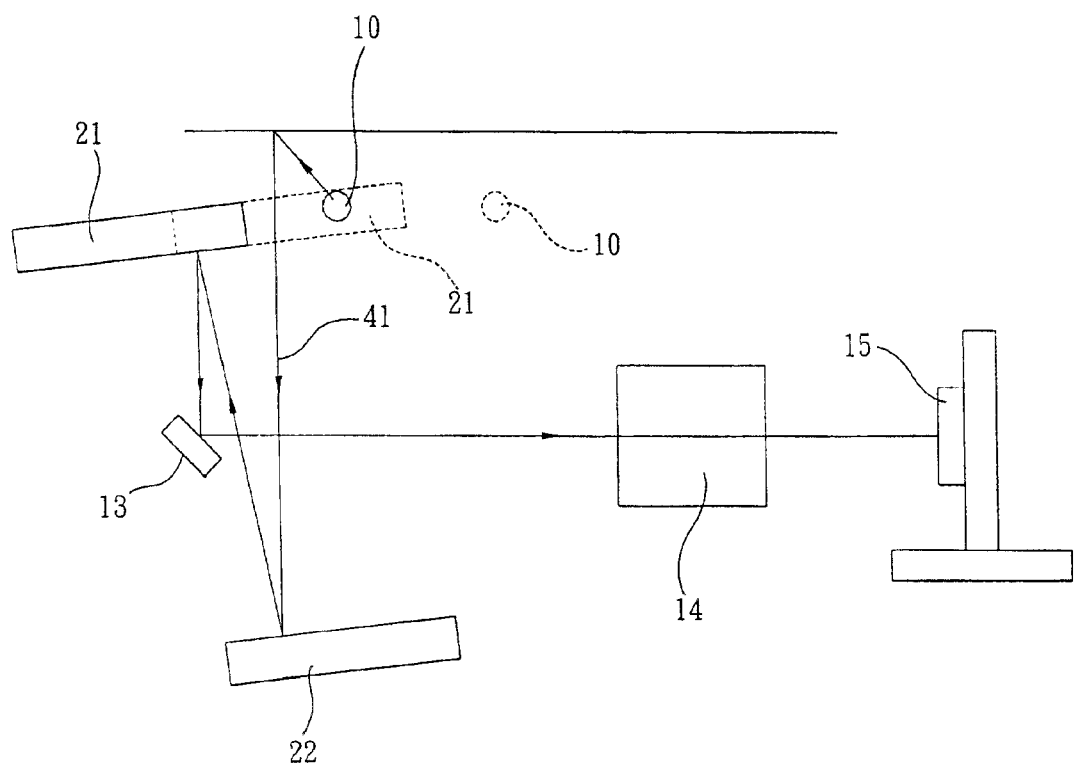
FIG. 25 shows the structure and the path of light when one of the first reflection mirror of the third type assembly and the light source are moved.

FIG. 25 shows the structure and the path of light when the first reflection mirror 21 and the light source are moved. As shown in the figure, the first reflection mirror 21 is moved further away from the second reflection mirror 21, and the light source 10 is closer to the second reflection mirror 22 (from the position shown in dotted lines to the position shown in solid lines). The area of the first reflection mirror 21 facing the second reflection mirror 22 becomes smaller so that the image information 41 is reflected 2 times between the first reflection mirror 21 and the second reflection mirror 22. The image information 41 is reflected by the final reflection mirror unit 13 and passes through the lens unit 14 and becomes an image on the sensor 15.

Comparing the results of the FIGS. 24 and 25, the first reflection mirror 21 and the light source 10 are simultaneously moved to left, the corresponding area between the first reflection mirror 21 and the second reflection mirror 22 becomes smaller. The number of reflection between the first reflection mirror 21 and the second reflection mirror 22 becomes less. The image information 41 is projected on a distal end of the second reflection mirror 22 and the value p resulted in the reflection of the image information 41 becomes smaller. Under the condition that the value of p is smaller and the value q changes in a minor way, a larger rate of magnifying and resolution can be obtained by moving the first reflection mirror 21 away from the second reflection mirror 22, and by moving the light source 10 close to the second reflection mirror 22.

The Third Embodiment of the Third Type Assembly

Figure 26:
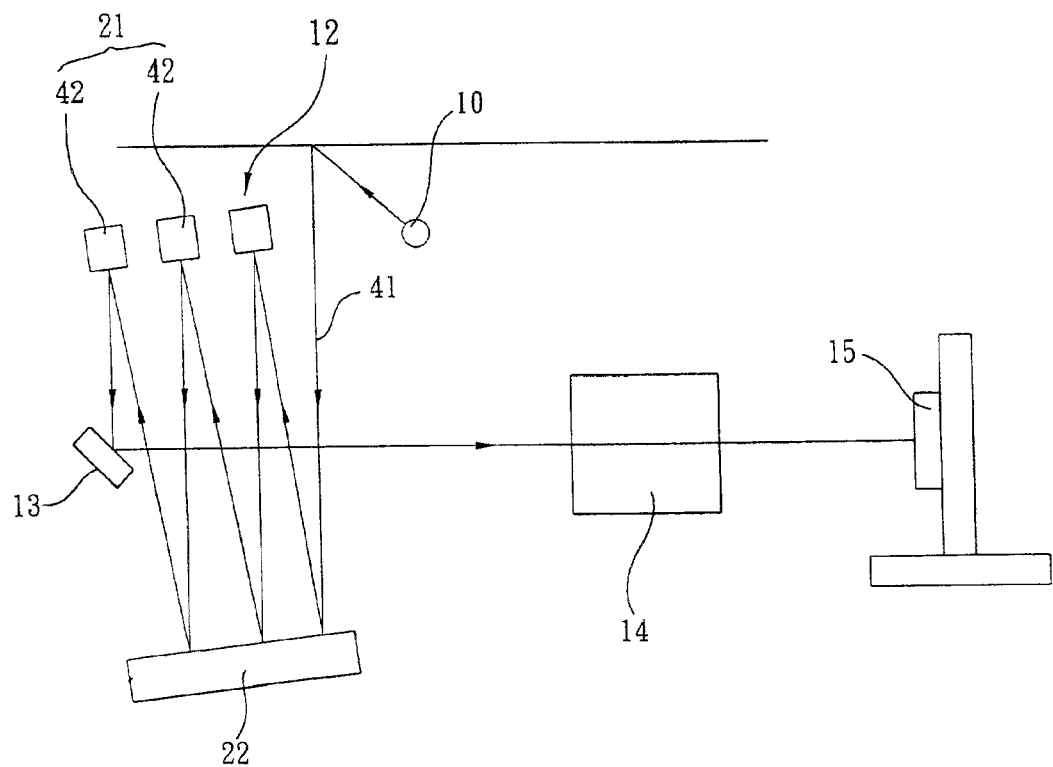
FIG. 26 shows the structure and the path of light wherein the first reflection mirror of the light folding device of the third type assembly is composed of multiple sub-reflection mirrors.

FIG. 26 shows the structure and the path of light of the light folding device 12 wherein the first reflection mirror 21 is composed of a plurality of sub-reflection mirrors 42. At least one of the sub-reflection mirror 42 of the first reflection mirror 21 is movable so that any one of the sub-reflection mirror 42 can be moved away from or close to the light source 10. In normal condition, the image information 41 is reflected 6 times in the light folding device 12.

Figure 27:
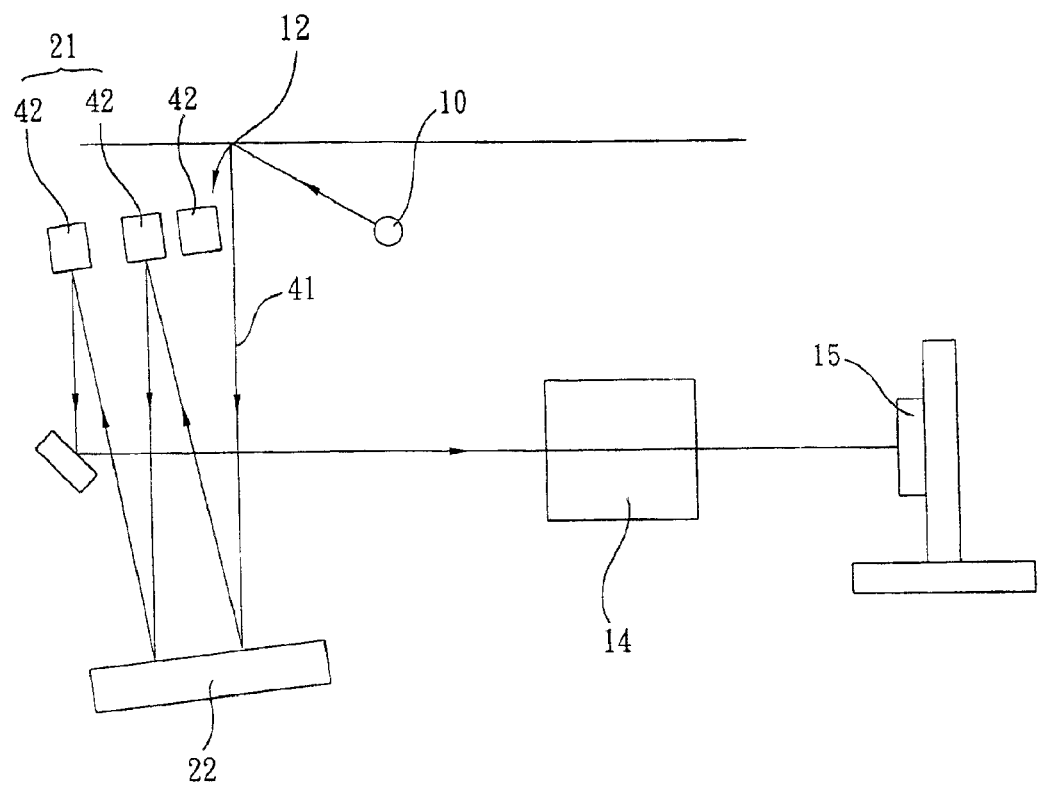
FIG. 27 shows the structure and the path of light when the light source is fixed and a sub-reflection mirror of the third type assembly is moved.

FIG. 27 shows the structure and the path of light when the light source 10 is not movable and the sub-reflection mirror 42 is moved. When proceeding the adjustment, the light source 10 is not movable and the sub-reflection mirror 42 is moved toward the sub-reflection mirror 42. The path of the image information changes and is reflected 4 times between the first reflection mirror 21 and the second reflection mirror 22.

Figure 28:
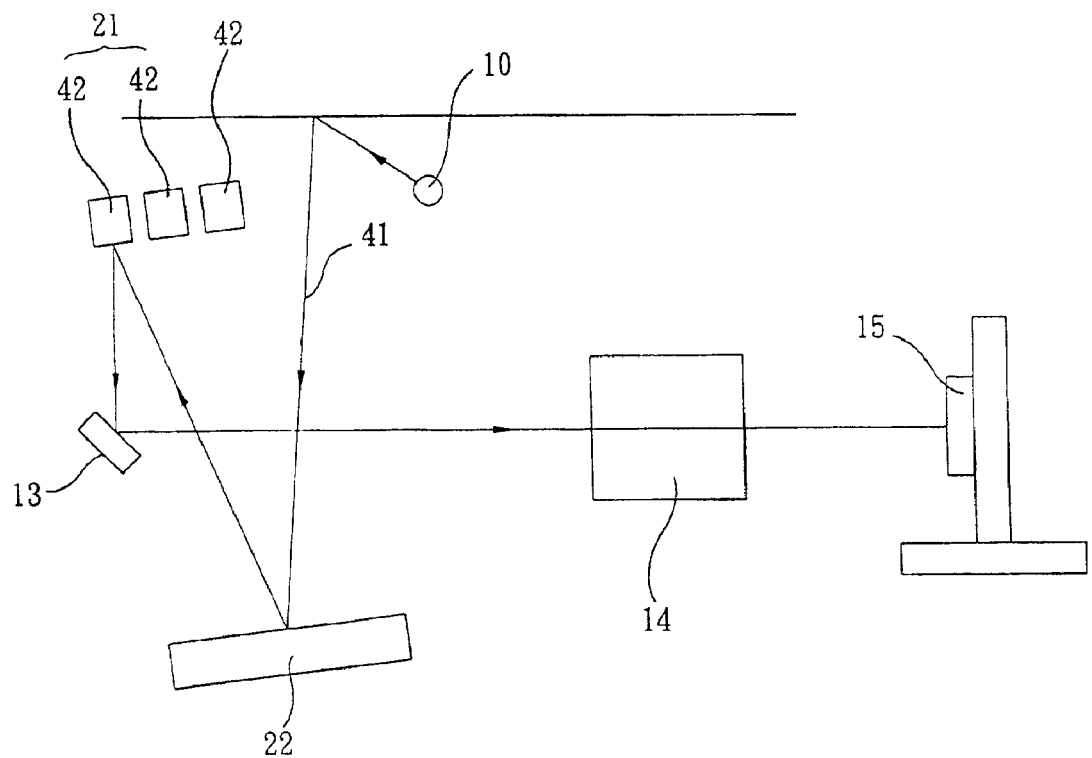
FIG. 28 shows the structure and the path of light when the light source is fixed and the sub-reflection mirrors located at the right side and the middle of the first reflection mirror of the third type assembly are moved toward the sub-reflection at the left side.

FIG. 28 shows the structure and the path of light when the light source 10 is not movable and the sub-reflection mirrors 42 at the right and middle of the first reflection mirror 21 are moved to the left toward the sub-reflection mirror 42. As shown in the figure, the sub-reflection mirrors 42 are moved away from the light source 10 so as to avoid the original image information 41. The other image information 41 is reflected 2 times between the sub-reflection mirror 42 of the first reflection mirror 21 and the second reflection mirror 22 after it is entered in the light folding device 12. The image information 41 is received and reflected by the final reflection mirror 13 and passes through the lens unit 14 and becomes an image on the sensor 15.

Comparing the results of the FIGS. 27 and 28, it is noticed that when adjusting any of the sub-reflection mirror 42 of the first reflection mirror 21 reduces the number of reflection of the image information 41 between the first reflection mirror 21 and the second reflection mirror 22. The value of p formed by the reflection of the image information becomes smaller under the condition that the value of p is obviously reduces and q is not changed too much, a larger rate of magnifying and resolution can be obtained by adjusting the relative position between any one of the sub-reflection mirrors 42 of the first reflection mirror 21 and the light source 10.

The Fourth Embodiment of the Third Type Assembly

Figure 29:
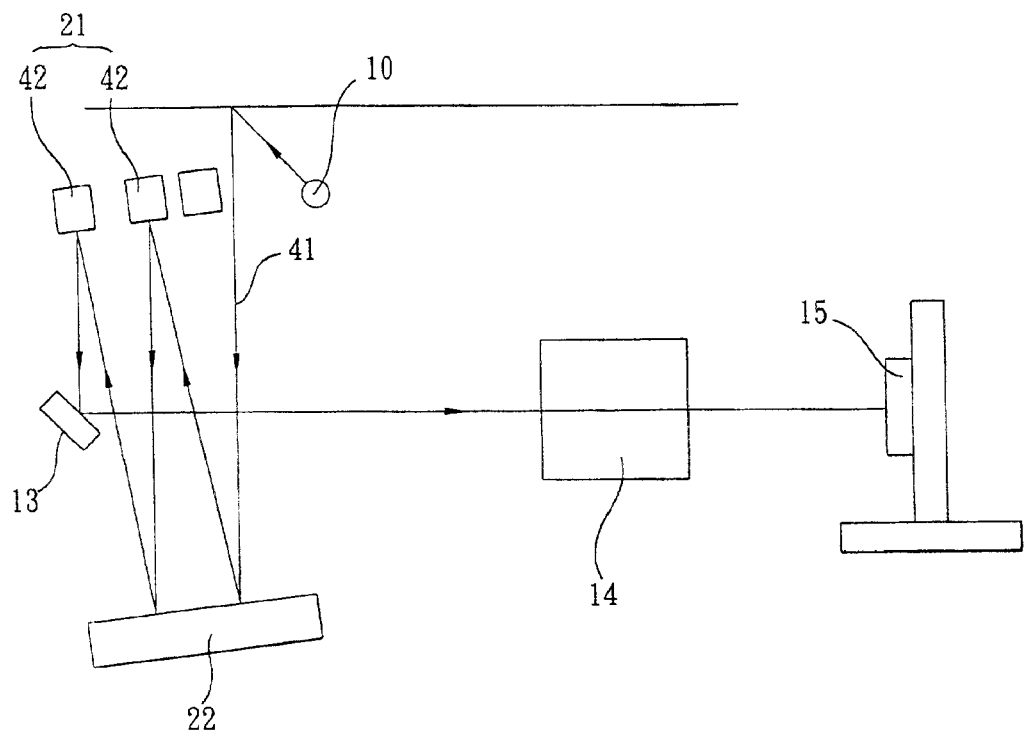
FIG. 29 shows the structure and the path of light when the sub-reflection mirror and the light source of the third type assembly are moved.

FIG. 29 shows the structure and the path of light when the sub-reflection mirror 42 and the light source 10 are moved. The first reflection mirror 21 of the light folding device 12 is composed of a plurality of sub-reflection mirrors 42. At least one of the sub-reflection mirrors 42 of the first reflection mirror 21 and the light source are moved by a driving device (not shown).

When moving one of the sub-reflection mirrors 42 at the right of the first reflection mirror 21 toward the sub-reflection mirror 42 at the left and moving the light source 10 toward the second reflection mirror 22. The image information 41 is reflected 4 times between the first reflection mirror 21 and the second reflection mirror 22.

Comparing the results of the FIGS. 26 and 29, it is noticed that when the light source is moved close to the second reflection mirror 22, and the sub-reflection mirrors 42 of the first reflection mirror 21 are moved toward with each other, the number of times of reflection between the first reflection mirror 21 and the second reflection mirror 22 is reduced. The value of p formed by the reflection of the image information becomes smaller under the condition that the value of p is obviously reduces and q is not changed too much, a larger rate of magnifying and resolution can be obtained by adjusting the sub-reflection mirror 42 of the first reflection mirror 21 and the light source 10.

CONCLUSION

In the types of assembly mentioned above, the angle driving device 31 for driving the light folding device 12, the driving device for driving the final reflection unit 13, and the driving device for simultaneously driving the light source 10 and the light folding device 12 are not necessarily existed simultaneously. In other words, at least one of the driving devices to drive its corresponding item can achieve the purpose of changing the path of light of the image information.

The adjustment can be automatically completed when the users sets the resolution and the types of the document to be scanned. The lens unit 14 and the sensor 15 automatically adjust the focus distance and the image distance needed, and this is easily to be operated.

While we have shown and described the embodiment in accordance with the present invention, it should be clear to those skilled in the art that further embodiments may be made without departing from the scope of the present invention.

What is claimed is:

1. A multiple-resolution scanning device comprising:
   at least one light source for illuminating a document to generate an image information;
   a light folding device having a first reflection mirror and a second reflection mirror which faces the first reflection mirror, the light folding device introducing the image information and the image information being reflected between the first reflection mirror and the second reflection mirror;
   a final reflection mirror unit including at least one reflection mirror for receiving and reflecting the image information coming from the light folding device;
   a lens unit located in the path of light of the image information reflected from the final reflection mirror unit, for receiving the image information from the final reflection mirror unit and focusing the image information;
   an optical sensor for receiving the focused image information in the lens unit, and
   at least one driving device for driving one of the light source, the light folding device, and the final reflection mirror unit;
   wherein a distance between the document and the lens is designated by "p", and a distance between the image and the lens is designated by "q", the focus of the lens is designated by "f", an equation for obtaining the image is expressed by $1/p+1/q=1/f$, resolution of the scanning device is expressed by $q/p$, a value of $q/p$ will be changed only by changing the "p" or "q", the multiple-resolution scanning device in accordance with the present invention adjusts the resolution by changing "p" or "q" of scan lines reflected from a same position of the document, actually by changing travel distance of the scan lines reflected from the same position of the document.

2. The device as claimed in claim 1, wherein at lest one of the first reflection mirror and the second reflection mirror of the light folding device is rotatable.

3. The device as claimed in claim 1, wherein at lest one of the first reflection mirror and the second reflection mirror of the light folding device is movable.

4. The device as claimed in claim 1, wherein at lest one of the first reflection mirror and the second reflection mirror of the light folding device is composed of multiple sub-reflection mirrors.

5. The device as claimed in claim 4, wherein at lest one of the sub-reflection mirror is movable.

6. The device as claimed in claim 4, wherein at lest one of the sub-reflection mirror is rotatable and movable.

7. The device as claimed in claim 1, wherein the light folding device and the light source are moved simultaneously.

8. The device as claimed in claim 1, wherein the final reflection mirror unit includes a reflection mirror.

9. The device as claimed in claim 8, wherein the reflection mirror of the final reflection mirror unit is movable.

10. The device as claimed in claim 8, wherein the reflection mirror of the final reflection mirror unit is rotatable.

11. The device as claimed in claim 1, wherein the final reflection mirror unit comprises a first reflection mirror and a second reflection mirror.

12. The device as claimed in claim 11, wherein at least one of the first reflection mirror and the second reflection mirror of the final reflection mirror unit is movable.

13. The device as claimed in claim 11, wherein at least one of the first reflection mirror and the second reflection mirror of the final reflection mirror unit is rotatable.

14. The device as claimed in claim 7, wherein the light folding device comprises the first reflection mirror and the second reflection mirror, the first reflection mirror moves simultaneously with the second reflection mirror.

15. The device as claimed in claim 7, wherein the light folding device comprises the first reflection mirror and the second reflection mirror, the first reflection mirror includes multiple sub-reflection mirrors and at least one of the sub-reflection mirrors move simultaneously with the light source.

* * * * *